United States Patent
Minakian et al.

(10) Patent No.: US 10,830,469 B2
(45) Date of Patent: Nov. 10, 2020

(54) HUMIDIFIER MEASUREMENT AND CONTROL

(71) Applicant: D-M-S Holdings, Inc., West Des Moines, IA (US)

(72) Inventors: Stephen Minakian, Denver, CO (US); Oishee Sarkar, Waukegan, IL (US); Samuel Bradley, Mundelein, IL (US); Vidya Vasudevan, Sunnyvale, CA (US)

(73) Assignee: D-M-S Holdings, Inc., West Des Moines, IA (US)

( * ) Notice: Subject to any disclaimer, the term of this patent is extended or adjusted under 35 U.S.C. 154(b) by 430 days.

(21) Appl. No.: 15/665,604

(22) Filed: Aug. 1, 2017

(65) Prior Publication Data

US 2019/0041074 A1     Feb. 7, 2019

(51) Int. Cl.
*F24F 11/30*       (2018.01)
*F24F 6/12*       (2006.01)
(Continued)

(52) U.S. Cl.
CPC .............. *F24F 11/30* (2018.01); *F24F 6/12* (2013.01); *F24F 11/0008* (2013.01);
(Continued)

(58) Field of Classification Search
CPC .... G01F 23/265; G01F 23/68; G01F 25/0061; G01F 23/266; G01F 23/268; F24F 11/30;
(Continued)

(56) References Cited

U.S. PATENT DOCUMENTS

| 3,166,332 A | * | 1/1965 | Olson | F16J 15/106 |
| | | | | 277/644 |
| 3,637,194 A | * | 1/1972 | Swimmer | F24F 6/04 |
| | | | | 261/29 |

(Continued)

FOREIGN PATENT DOCUMENTS

| CN | 101149174 A | 3/2008 |
| CN | 101457965 A | 6/2009 |

(Continued)

OTHER PUBLICATIONS

EPO translation of DE-4037927-A1 (Year: 1992).*
(Continued)

*Primary Examiner* — Stephen Hobson
(74) *Attorney, Agent, or Firm* — Fredrikson & Byron, P.A.

(57) ABSTRACT

Humidifiers can include a liquid tank removably attachable to a base portion. The liquid tank can include an upper connector configured to engage a lower connector of the base portion when the liquid tank and the base portion are attached. The liquid tank can include a touch interface configured to receive a touch input from outside of the liquid tank and a liquid level sensor configured to output a signal representative of a level of liquid in the liquid tank. The base portion can include a controller that is in electrical communication with the liquid level sensor and the touch interface when the upper connector engages the lower connector. The controller can be configured to adjust operation of the humidifier based on signals received from the touch interface and can receive signals from the liquid level sensor representative of the amount of liquid in the liquid tank.

12 Claims, 16 Drawing Sheets

(51) Int. Cl.

| | |
|---|---|
| *G01F 23/26* | (2006.01) |
| *G01F 23/68* | (2006.01) |
| *F24F 11/00* | (2018.01) |
| *F24F 11/89* | (2018.01) |
| *G01F 25/00* | (2006.01) |
| *F24F 6/00* | (2006.01) |
| *F24F 11/52* | (2018.01) |
| *F24F 11/32* | (2018.01) |
| *F24F 110/00* | (2018.01) |
| *F24F 13/20* | (2006.01) |

(52) U.S. Cl.
CPC ............ *F24F 11/89* (2018.01); *G01F 23/265* (2013.01); *G01F 23/266* (2013.01); *G01F 23/268* (2013.01); *G01F 23/68* (2013.01); *G01F 25/0061* (2013.01); *F24F 11/32* (2018.01); *F24F 11/52* (2018.01); *F24F 2006/008* (2013.01); *F24F 2013/205* (2013.01); *F24F 2110/00* (2018.01); *F24F 2221/38* (2013.01)

(58) Field of Classification Search
CPC .......... F24F 11/0008; F24F 11/89; F24F 6/12; F24F 2013/205; F24F 2221/38; F24F 11/52; F24F 11/32; F24F 2110/00; F24F 2006/008
See application file for complete search history.

(56) References Cited

U.S. PATENT DOCUMENTS

| | | | | |
|---|---|---|---|---|
| 3,905,669 | A * | 9/1975 | McCormick | H01R 13/631 439/380 |
| D244,692 | S | 6/1977 | Schimanski | |
| 4,098,853 | A * | 7/1978 | Brown | A61M 16/1075 128/200.13 |
| 5,062,276 | A * | 11/1991 | Dudley | F24F 11/00 62/176.6 |
| 5,135,485 | A * | 8/1992 | Cohen | A61M 5/1684 324/606 |
| 5,423,214 | A * | 6/1995 | Lee | G01C 9/06 73/304 C |
| D364,676 | S | 11/1995 | Chiu et al. | |
| 5,632,333 | A * | 5/1997 | Imamura | B01D 53/265 165/228 |
| 5,908,491 | A | 6/1999 | Hobbs | |
| D449,877 | S | 10/2001 | Delmenico et al. | |
| D464,130 | S | 10/2002 | Denham et al. | |
| 6,490,920 | B1 * | 12/2002 | Netzer | G01C 9/06 324/687 |
| 6,792,963 | B2 * | 9/2004 | Kopel | F04F 10/00 137/132 |
| D513,797 | S | 1/2006 | Wang | |
| 7,073,781 | B2 * | 7/2006 | Mulvaney | A61L 2/10 239/34 |
| 7,419,533 | B2 | 9/2008 | Son et al. | |
| 7,448,224 | B2 | 11/2008 | Wu et al. | |
| 7,465,338 | B2 | 12/2008 | Kurasek | |
| 7,766,310 | B2 * | 8/2010 | Wolff | F24F 6/00 261/72.1 |
| 7,837,958 | B2 | 11/2010 | Crapser et al. | |
| 8,196,064 | B2 | 6/2012 | Krzyzanowski et al. | |
| D683,737 | S | 6/2013 | Brinda et al. | |
| 8,590,375 | B2 * | 11/2013 | Farmanyan | G01F 23/268 324/668 |
| 8,739,780 | B2 | 6/2014 | Tang et al. | |
| 8,747,147 | B2 | 6/2014 | Yu et al. | |
| 8,769,780 | B1 | 7/2014 | Segel | |
| 8,827,247 | B2 | 9/2014 | Kanel et al. | |
| 8,844,908 | B2 | 9/2014 | Lev et al. | |
| D724,714 | S | 3/2015 | Benson et al. | |
| 9,107,690 | B2 | 8/2015 | Bales, Jr. et al. | |
| 9,157,942 | B2 | 10/2015 | Rutheiser | |
| 9,207,110 | B2 * | 12/2015 | Kawaguchi | G01F 23/22 |
| 9,354,099 | B2 * | 5/2016 | Tichborne | G01F 23/265 |
| D759,079 | S | 6/2016 | Carlton et al. | |
| 9,439,995 | B2 | 9/2016 | Conroy et al. | |
| D771,076 | S | 11/2016 | Butcher et al. | |
| D772,241 | S | 11/2016 | Capano | |
| D781,879 | S | 3/2017 | Butcher et al. | |
| D787,533 | S | 5/2017 | Butcher et al. | |
| D795,906 | S | 8/2017 | Butrick | |
| D797,763 | S | 9/2017 | Kim et al. | |
| D800,285 | S | 10/2017 | Seo et al. | |
| D803,375 | S | 11/2017 | Wu et al. | |
| D804,502 | S | 12/2017 | Amini et al. | |
| D806,107 | S | 12/2017 | Kim et al. | |
| D806,844 | S | 1/2018 | Kim et al. | |
| D807,998 | S | 1/2018 | Kim et al. | |
| D810,260 | S | 2/2018 | Sevy | |
| D810,261 | S | 2/2018 | Chen | |
| D810,263 | S | 2/2018 | Lu | |
| D811,570 | S | 2/2018 | Tang | |
| D811,571 | S | 2/2018 | Hu | |
| D812,210 | S | 3/2018 | Tang | |
| D813,366 | S | 3/2018 | Tang | |
| D813,367 | S | 3/2018 | Situ | |
| D813,368 | S | 3/2018 | Zuo | |
| D825,595 | S | 8/2018 | Narinedhat et al. | |
| D826,963 | S | 8/2018 | Guan et al. | |
| 10,151,616 | B1 * | 12/2018 | Otagaki | G01F 23/265 |
| D840,423 | S | 2/2019 | Narinedhat et al. | |
| 2003/0106761 | A1 | 6/2003 | Taylor | |
| 2004/0108604 | A1 | 6/2004 | Pan et al. | |
| 2007/0216259 | A1 | 9/2007 | Kang | |
| 2007/0284361 | A1 * | 12/2007 | Nadjafizadeh | A61M 16/021 219/442 |
| 2011/0138906 | A1 | 6/2011 | Schastok et al. | |
| 2012/0024159 | A1 | 2/2012 | Riessbeck et al. | |
| 2012/0053738 | A1 | 3/2012 | Lingrey et al. | |
| 2012/0116695 | A1 * | 5/2012 | Young | G01F 23/40 702/55 |
| 2012/0180655 | A1 | 7/2012 | Law et al. | |
| 2012/0222548 | A1 * | 9/2012 | Lev | F24F 6/12 95/1 |
| 2013/0156605 | A1 * | 6/2013 | Mayleben | H01G 5/019 417/36 |
| 2013/0174916 | A1 * | 7/2013 | Hampton | G01F 23/268 137/2 |
| 2014/0202460 | A1 | 7/2014 | Bath et al. | |
| 2014/0210114 | A1 * | 7/2014 | Staniforth | F24F 13/20 261/30 |
| 2014/0268925 | A1 | 9/2014 | Lee et al. | |
| 2014/0319232 | A1 | 10/2014 | Gourlay et al. | |
| 2014/0358297 | A1 | 12/2014 | Fadell et al. | |
| 2014/0362032 | A1 | 12/2014 | Mo et al. | |
| 2015/0030317 | A1 | 1/2015 | Bayer et al. | |
| 2015/0153058 | A1 | 6/2015 | Chen | |
| 2015/0306335 | A1 * | 10/2015 | Winski | A61M 16/0003 128/203.14 |
| 2015/0317034 | A1 | 11/2015 | Kent et al. | |
| 2016/0033150 | A1 | 2/2016 | Staniforth et al. | |
| 2016/0047563 | A1 | 2/2016 | Kim et al. | |
| 2016/0146490 | A1 * | 5/2016 | McDonnell | F24F 6/12 261/70 |
| 2016/0153672 | A1 | 6/2016 | McDonnell | |
| 2016/0187899 | A1 | 6/2016 | Lee et al. | |
| 2016/0209058 | A1 | 7/2016 | Golden et al. | |
| 2016/0232949 | A1 | 8/2016 | Petivan, III et al. | |
| 2016/0356514 | A1 | 12/2016 | Cai et al. | |
| 2017/0089596 | A1 | 3/2017 | Kim | |
| 2017/0122586 | A1 | 5/2017 | Son | F24F 13/20 |
| 2017/0299416 | A1 * | 10/2017 | Rondano | G01F 23/266 |
| 2017/0299417 | A1 * | 10/2017 | Otagaki | G01F 23/268 |
| 2018/0094825 | A1 * | 4/2018 | Peczalski | F24F 13/22 |
| 2018/0095484 | A1 * | 4/2018 | George | F24F 11/30 |
| 2018/0195747 | A1 | 7/2018 | Xiao | |
| 2018/0238715 | A1 * | 8/2018 | Shim | G01F 23/265 |
| 2019/0063768 | A1 * | 2/2019 | Chen | F24F 11/88 |

(56) References Cited

U.S. PATENT DOCUMENTS

| | | | |
|---|---|---|---|
| 2019/0063981 A1* | 2/2019 | Otagaki | G01F 23/268 |
| 2019/0154287 A1* | 5/2019 | Pham | F24F 11/30 |
| 2020/0141597 A1* | 5/2020 | Amundson | F24F 11/80 |

FOREIGN PATENT DOCUMENTS

| | | | |
|---|---|---|---|
| CN | 201787692 U | 4/2011 | |
| CN | 204063389 U | 12/2014 | |
| CN | 105650795 A | 6/2016 | |
| CN | 105674481 A | 6/2016 | |
| CN | 106403123 A | 2/2017 | |
| CN | 106705326 A | 5/2017 | |
| CN | 106949588 A | 7/2017 | |
| DE | 4037927 A1 * | 5/1992 | G01F 23/266 |
| DE | 202010017455 U1 | 1/2012 | |
| DE | 102015203744 A1 | 9/2016 | |
| EP | 1426700 A1 | 6/2004 | |
| EP | 2860464 A1 | 4/2015 | |
| EP | 3163185 A1 | 5/2017 | |
| JP | S5022950 U | 3/1975 | |
| JP | 2007181804 A | 7/2007 | |
| JP | 2009133505 A | 6/2009 | |
| KR | 100211160 B1 | 4/1999 | |
| KR | 100704148 B1 | 3/2007 | |
| KR | 1020110023478 A | 3/2011 | |
| KR | 1020130003437 A | 1/2013 | |
| KR | 1020130011170 A | 1/2013 | |
| KR | 101310797 B1 | 9/2013 | |
| KR | 1020160016119 A | 2/2016 | |
| KR | 1020160095264 A | 8/2016 | |
| KR | 101743032 B1 | 6/2017 | |
| WO | 2009070902 A1 | 6/2009 | |
| WO | 2013012179 A2 | 1/2013 | |
| WO | 2014065482 A1 | 5/2014 | |
| WO | 2014110159 A1 | 7/2014 | |
| WO | 2014191818 A2 | 12/2014 | |
| WO | 2014207629 A1 | 12/2014 | |
| WO | 2016042459 A1 | 3/2016 | |
| WO | 2016057568 A1 | 4/2016 | |
| WO | 2016059409 A2 | 4/2016 | |
| WO | 2016145027 A1 | 9/2016 | |

OTHER PUBLICATIONS

Atkins et al., unpublished U.S. Appl. No. 15/665,611, entitled Humidifier Liquid Tank, filed Aug. 1, 2017, 41 pages.
Atkins et al., unpublished U.S. Appl. No. 15/665,614, entitled Humidifier Reservoir Fluid Control, filed Aug. 1, 2017, 38 pages.
Bradley et al., unpublished U.S. Appl. No. 29/612,426, entitled Humidifier, filed Aug. 1, 2017, 35 pages.
Bradley et al., unpublished U.S. Appl. No. 29/612,427, entitled Target Humidity Graphical Control, filed Aug. 1, 2017, 5 pages.
Sarkar et al., unpublished U.S. Appl. No. 15/665,616, entitled Humidifier User Interaction, filed Aug. 1, 2017, 113 pages.
European Patent Application No. 18186626.0, Extended European Search Report dated Jan. 25, 2019, 7 pages.
"Hall Effect Sensor" Wikipedia published Jul. 24, 2017 accessed at https://en.wikipedia.org/w/index.php?title=Hall_effect_sensor&oldid=618219433, 5 pgs.
English Machine Translation for Chinese Publication No. CN105650795, published Jun. 8, 2016, 6 pgs.
English Machine Translation for Chinese Publication No. 105674481, published Jun. 15, 2016, 16 pgs.

* cited by examiner

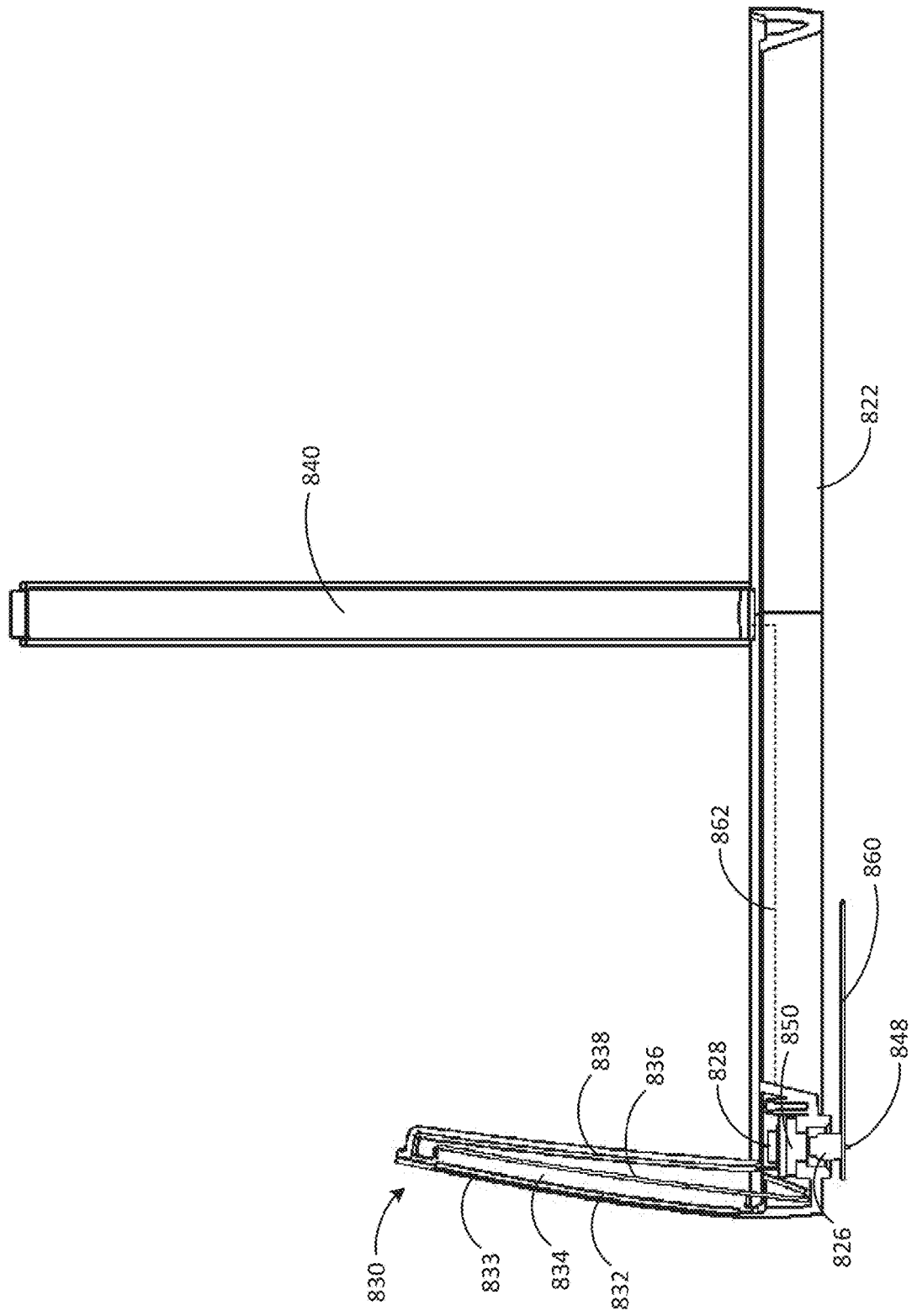

HUMIDIFIER MEASUREMENT AND CONTROL

TECHNICAL FIELD

This disclosure generally relates to humidifiers and methods associated with humidifiers.

BACKGROUND

Low humidity in an ambient environment may cause discomfort and, in some instances, health-related issues (e.g., respiratory issues). To increase the moisture content of air in an ambient environment, a humidifier can be used. A humidifier can be supplied with water and operate to output a mist into the ambient environment, thereby increasing the ambient environment's moisture content.

Currently available humidifiers can be limited in their design. Generally, currently available humidifiers include a fluid supply storage component. The fluid supply storage component can hold and supply water to the humidifier during operation and may be refilled with water by a user as needed. However, the design of such currently available humidifiers can make it difficult to access an interior of the fluid supply storage component. In many cases, the only opening to the interior of the fluid supply storage component is a small port used for both refilling and supplying water to the humidifier. The size of such port may substantially prevent access to the interior of the fluid supply storage component for cleaning or other maintenance.

Additionally, currently available humidifiers can be limited in their operational capability and efficiency. For example, these currently available humidifiers may lack the capability to easily and accurately control an amount of mist expelled from the humidifier. Such humidifiers may lack interfaces for providing the ability for the user to control various operating parameters.

Currently available humidifiers also may simply operate assuming there is water available for atomizing and/or otherwise introducing into the surrounding environment without any knowledge related to an amount of water available for operation. Additionally, water in a humidifier may eventually become stale before it has been used by the humidifier, which may lead to undesirable operating results when the stale water is introduced into the environment by the humidifier.

SUMMARY

Aspects of this disclosure are related to humidifiers including a base portion and a liquid tank removably attachable to the base portion. The base portion can include a controller and lower connector and the liquid tank can include an upper connector configured to engage the lower connector. The liquid tank can include a liquid level sensor positioned along a sidewall of the liquid tank configured to output a value indicative of an amount of liquid present in the liquid tank. Additionally or alternatively, the liquid tank can include a touch interface configured to receive a touch input from the outside of the liquid tank. In some embodiments, the liquid tank can include a mate ring that includes the upper connector and provides electrical communication between the upper connector and the touch interface and/or the liquid level sensor.

In some such embodiments, when the lower connector of the base portion engages the upper connector of the liquid tank, the controller in the base portion is in electrical communication with the liquid level sensor and/or the touch interface of the liquid tank. In various examples, the controller can be configured to control operation of the humidifier based on input signals received from the touch interface. For example, in some examples, the controller can be configured to adjust a mist output level from the humidifier using the touch interface. Additionally or alternatively, the controller can be configured to identify the level of liquid in the liquid tank based on an output value received from the liquid level sensor.

In some examples, the controller can be configured to monitor an amount of liquid in the liquid tank over time and establish a water freshness index representative of the freshness of the liquid in the liquid tank. In some such embodiments, the controller can be further configured to output an indication of the freshness index. In some examples, the indication of the freshness index can be output via a freshness indicator such as a colored light indicator.

This disclosure is filed concurrently with the following three patent applications that are owned by the owner of this disclosure: U.S. patent application Ser. No. 15/665,611, titled "Humidifier Liquid Tank"; U.S. patent application Ser. No. 15/665,614, titled "Humidifier Reservoir Fluid Control"; and U.S. patent application Ser. No. 15/665,616, titled "Humidifier User Interaction". These three patent applications are hereby incorporated into this disclosure by reference in their entirety.

The details of one or more examples are set forth in the accompanying drawings and the description below. Other features, objects, and advantages will be apparent from the description and drawings.

BRIEF DESCRIPTION OF THE DRAWINGS

The following drawings are illustrative of particular embodiments of the present invention and therefore do not limit the scope of the invention. The drawings are intended for use in conjunction with the explanations in the following description. Embodiments of the invention will hereinafter be described in conjunction with the appended drawings, wherein like numerals denote like elements.

FIG. 8 is a cross-sectional view of the mate ring and other components taken along line 8-8 in FIG. 6.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, and/or dimensions are provided for selected elements. Those skilled in the art will recognize that many of the noted examples have a variety of suitable alternatives.

Figure 1A:
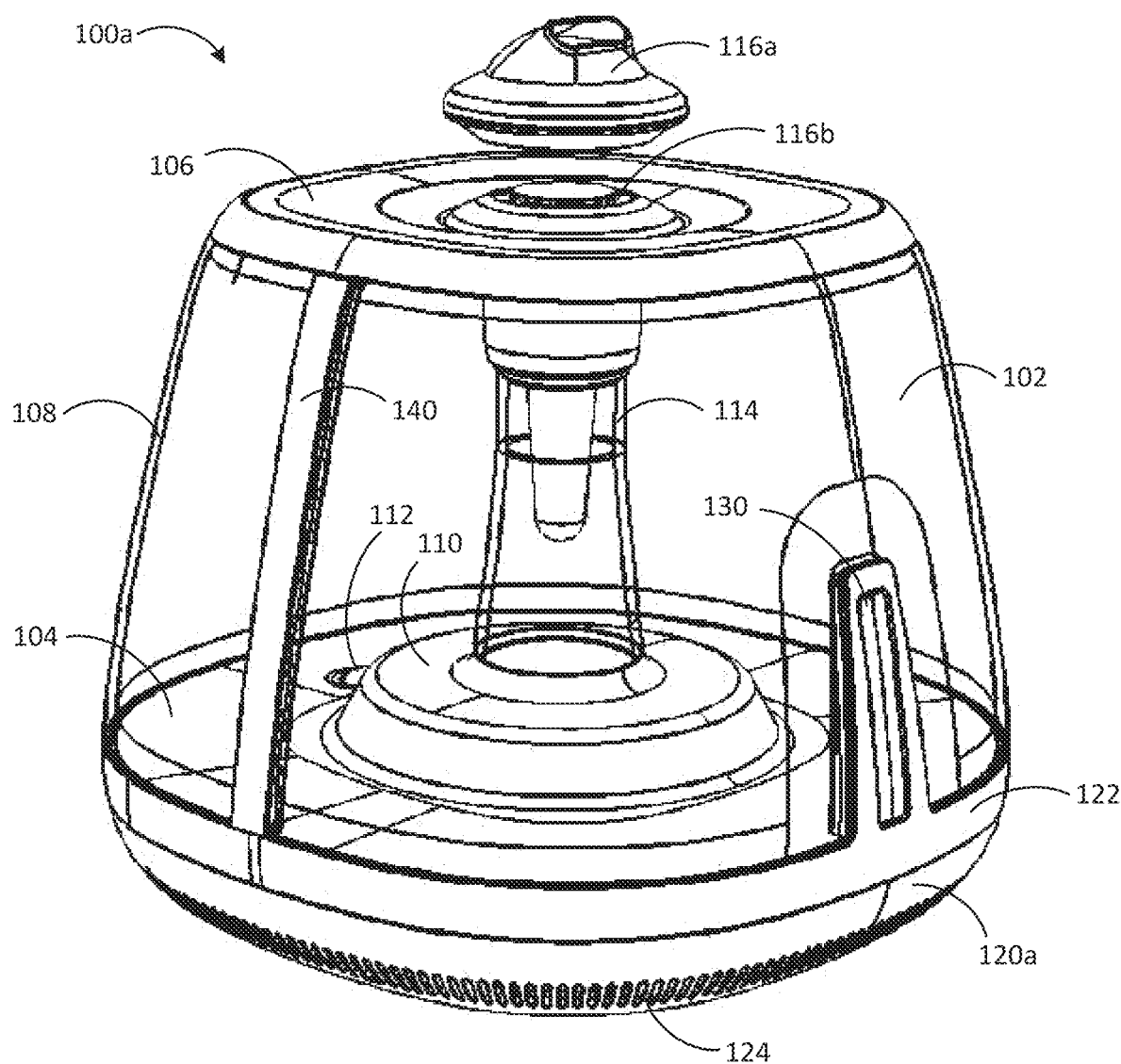
FIG. 1A is a perspective view of an exemplary embodiment of a humidifier.

FIG. 1A is a perspective view of an exemplary embodiment of a humidifier 100a. As shown, the humidifier 100a includes a liquid (e.g., water) tank 102. The liquid tank 102 defines a first interior volume therein that can store a supply of water or other liquid for use by the humidifier 100a. Liquid tank 102 includes a floor 104, a lid 106, and a sidewall 108 extending between the floor 104 and the lid 106. In one example, the first interior volume of the liquid tank 102 can be defined by the sidewall 108 between the floor 104 and the lid 106. In the illustrated embodiment of FIG. 1A, the sidewall 108 substantially surrounds the perimeter of the humidifier 100a. However, it will be appreciated that in various embodiments, the liquid tank 102 need not necessarily extend to the outer limits of the humidifier 100a. That is, in some examples, the sidewall 108 of the liquid tank 102 does not necessarily surround or follow the perimeter of the humidifier 100a. In the illustrative example of FIG. 1A, sidewall 108 is shown as clear. In some examples, the sidewall 108 may be clear, transparent, translucent, or the like so that a user may readily observe certain parameters, such as the level of liquid within the liquid tank 102. In other examples, the sidewall 108 may be opaque.

In the example of FIG. 1A, the floor 104 of the liquid tank 102 can enclose, at least in part, a reservoir 110 (below the surface) in which liquid can be stored for more immediate use by the humidifier 100a than the liquid in the liquid tank 102. That is, in some examples, humidifier 100a uses liquid in the reservoir 110 to humidify the environment surrounding the humidifier 100a, while liquid from the liquid tank 102 is used to replenish the reservoir 110 as appropriate. In the example of FIG. 1A, the humidifier 100a includes a selective sealing component 112 disposed in the floor 104 of the liquid tank 102 to facilitate communication of liquid to the reservoir 110 from the first interior volume of the liquid tank 102.

Humidifier 100a includes a fluid column 114 through which atomized liquid can travel from the reservoir 110 out of the humidifier 100a. The column 114 can extend within the interior volume of the liquid tank 102. As shown in the example of FIG. 1A, the column 114 is centered within the liquid tank 102. The lid 106 can include a cap (e.g., 116a, 116b) disposed over the column 114 to control the emission of mist (e.g., water). For example, a directional cap 116a can be used to emit mist in a preferred direction from the humidifier 100a. In other examples, a domed cap 116b can provide substantially radially uniform mist emission. In some embodiments, such caps can be interchangeable for desired operation by the user.

In the illustrated embodiment, the lid 106 of the tank 102 includes a burp valve 118. The burp valve 118 can allow for fluid communication between the first interior volume of the tank 102 and an ambient environment. In one example, the burp valve 118 can be actuated between a first position that allows for such fluid communication thereat and a second positon that seals the first interior volume from the ambient environment thereat. The burp valve 118 may, as an example, be a self-actuated pressure control valve such that it is configured to actuate from the second position to the first position when a pressure within first interior volume of the tank 102 reaches a predetermined pressure level. For instance, at times when the column 114 is sealed from the ambient environment, communication of liquid from the tank 102 to the reservoir 110 may cause pressure to build within the tank 102. If this pressure builds to a sufficient level, it may tend to hold liquid in the tank 102 and thereby impede communication of liquid from the tank 102 to the reservoir 110. Accordingly, the burp valve 118 can be useful in relieving pressure built up within the tank 102 by allowing air to pass between the first interior volume of the tank 102 and the ambient environment.

In the example of FIG. 1A, the humidifier 100a includes a base portion 120a supporting the tank 102. In some embodiments, the base portion 120a can house all, or a portion of, reservoir 110 below the floor 104 of the tank 102. The base portion 120a can similarly house other components useful for operation of the humidifier 100a. In various examples, the base portion 120a can house components such as an atomizer for producing mist from liquid in the reservoir 110, one or more fans, a controller for facilitating various operations of the humidifier 100a, one or more sensors (e.g., a liquid quantity sensor), one or more power supplies for providing electrical power to various humidifier components, and the like.

In the illustrated example, the base portion 120a is removably coupled to the tank 102 by way of a mate ring 122. In some examples, the mate ring is integrally formed into the tank 102 such that when the tank 102 and base portion 120a are joined, the mate ring 122 engages base portion 120a. The mate ring 122 and tank bottom can provide a sealing engagement between the base portion 120a and the tank 102 so that liquid in the tank 102 and/or the base portion 120a (e.g., in reservoir 110) does not escape the humidifier 100a at the interface between the tank 102 and base portion 120a.

The humidifier 100a of FIG. 1A can include an interface 130 and a tank liquid level sensor 140 positioned on the liquid tank 102. In some embodiments, the interface 130 provides interaction with a user. Such interaction can include receiving an input from a user, such as a mist emission setting, for example, via a touch screen, push-button interface, one or more dials, switches, or the like. In some examples, combinations of such interface can be used. Additionally or alternatively, interface 130 can be used for outputting information to a user, such as an indication of a mist emission setting, for instance, via one or more light indicators, such as light emitting diodes (LEDs) or other light sources.

In various examples, light from the interface 130 can present information to the user, such as a mist emission level from the humidifier. In some such examples, the interface includes a plurality of light emitting elements arranged linearly. The number of light emitting elements that actively emit light can correspond to a level of mist emission. For example, a lowest level of mist emission can correspond to a single light source, for instance, positioned nearest the mate ring 122. As the mist emission increases, the number of active light sources can similarly increase to represent the increasing emission.

As shown, humidifier 100a further comprises the tank liquid level sensor 140 that can be used to detect the level of liquid in the liquid tank 102. For instance, in the illustrated examples, tank liquid level sensor 140 extends along the vertical dimension of sidewall 108 so that the interface between the liquid and air in the tank 102 at the tank liquid level sensor 140 is representative of the amount of liquid in the tank 102. In some embodiments, tank liquid level sensor 140 comprises a capacitive sensor configured to detect the liquid level based on changes in capacitance at the tank liquid level sensor 140. In some such examples, the internal components of the tank liquid level sensor 140 can be isolated from the external environment surrounding the humidifier 100a so that any stray electric fields or touching of the outer surface of the humidifier 100a does not impact the capacitance of the tank liquid level sensor 140.

In some embodiments, a controller can be configured to control operation of one or more components such as the interface 130, tank liquid level sensor 140, atomizer (not shown), fan (not shown), a reservoir valve, and the like. In some such embodiments, the controller can be positioned in the base portion 120a of the humidifier 100a. A controller positioned in the base portion 120a can communicate with various components via wired or wireless communication. In some examples, the controller positioned in the base portion 120a can be arranged to communicate with components in the tank 102 (e.g., the interface 130, the tank liquid level sensor 140, etc.) via a connector that facilitates electrical communication between the base portion 120a and the mate ring 122.

As shown, base portion 120a of the humidifier 100a of FIG. 1A can include one or more vents 124, for example, for facilitating air transfer into the interior of the base portion 120a. In some examples, the base portion can include one or more sensors, such as a temperature sensor and/or a humidity sensor, for sensing conditions of the local environment of the humidifier. In some examples, properties of the air that enter the base portion 120a of the humidifier via the vent 124 can be analyzed using one or more sensors. Additionally or alternatively, vents 124 can facilitate cooling of various components housed within the base portion 120a.

In some embodiments, humidifier 100a includes one or more fans positioned within the base portion 120a to further promote air cooling of components within the base portion 120a, for example, by pulling in ambient air via vents 124. Additionally or alternatively, one or more fans within the humidifier 100a can be used to force mist from the atomizer through column 114 and out of the cap 116a and/or 116b.

In other examples, vents 124 may be excluded. For instance, in some embodiments, air cooling may not be necessary within the base portion 120a. Additionally or alternatively, in some embodiments, one or more sensors for sensing conditions of the ambient environment may be positioned outside of the humidifier and may be in wired or wireless communication with one or more humidifier components. In some such examples, vents (e.g., 124 in FIG. 1A) are not required for sampling ambient air via internal components housed in the base portion (e.g., 120a).

Figure 1B:
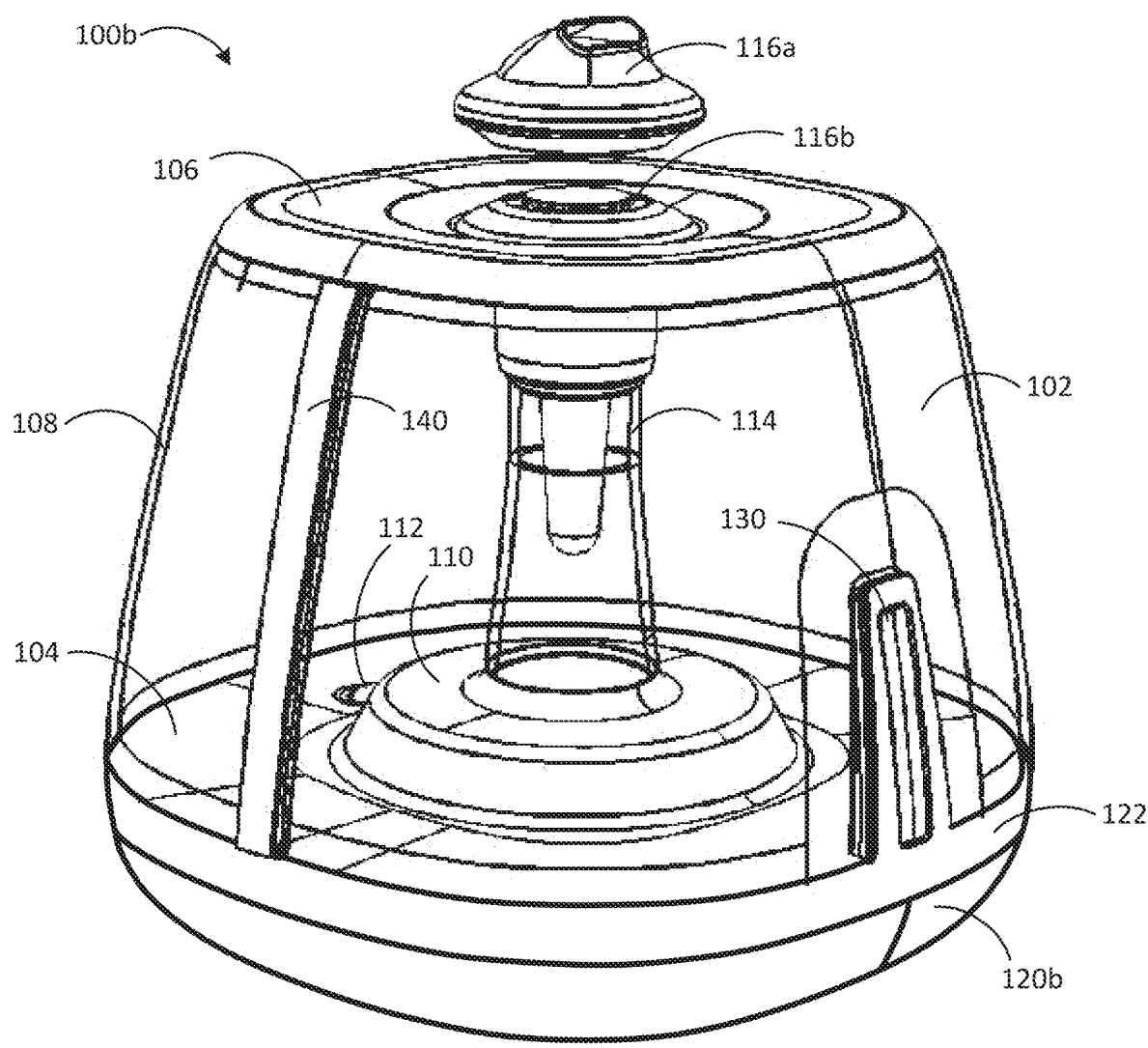
FIG. 1B is a perspective view of an alternative exemplary embodiment of a humidifier.

FIG. 1B shows a perspective view of an alternative humidifier without vents in the base portion. As shown, the humidifier 100b of FIG. 1B is similar to the humidifier 100a in FIG. 1A, and may operate generally as described with respect to humidifier 100a in FIG. 1A. However, as shown, base portion 120b of humidifier 100b does not include vents similar to vents 124 shown in base portion 120a in FIG. 1A.

Figure 2:
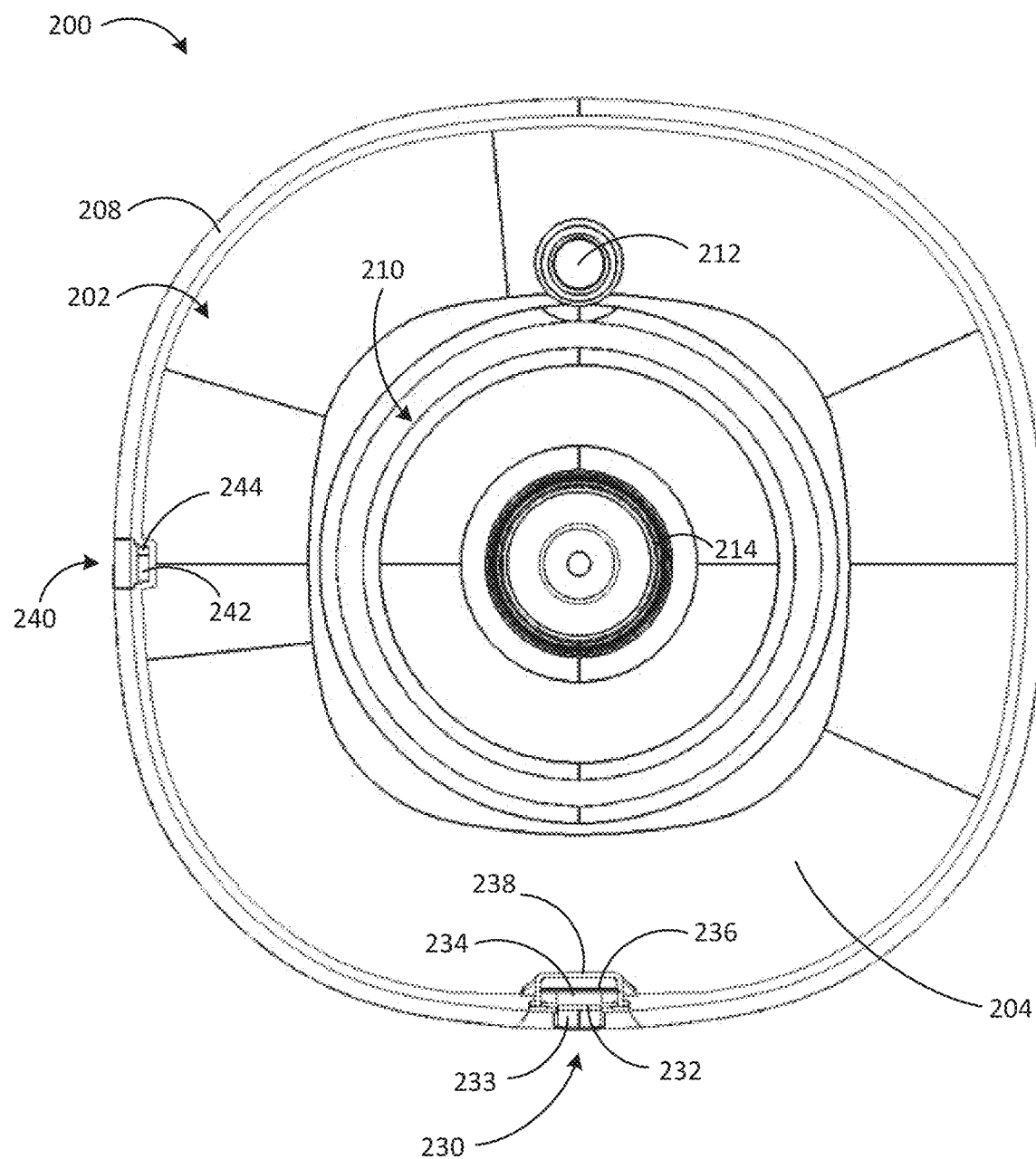
FIG. 2 shows a top-down cross-sectional view of a humidifier similar to those shown in FIGS. 1A and 1B.

FIG. 2 shows a top-down cross-sectional view of a humidifier similar to those shown in FIGS. 1A and 1B. Humidifier 200 of FIG. 2 includes a sidewall and a floor 204 of a liquid tank 202 for storing liquid for future use with humidifier 200. In some embodiments, during operation, liquid travels from the liquid tank 202 into a reservoir 210 via valve 212. Liquid in the reservoir can be atomized and introduced into the ambient atmosphere as mist via a column 214.

As described elsewhere herein, exemplary humidifier 200 can include an interface 230. In the illustrated example of FIG. 2, interface 230 includes a light pipe 234 into which light can be emitted for presenting information to a user. The interface 230 includes a board 236 that can support one or more light emitting elements (e.g., LEDs) positioned proximate the light pipe 234 so that light from the light emitting elements is emitted into the light pipe 234.

The interface 230 as shown in FIG. 2 further includes a lens 232 positioned proximate the exterior surface of the light pipe 234. Lens 232 can facilitate transmission of light from inside the light pipe 234 to a user. In some examples, the lens 232 may be configured to detect the touch of a user, for example, via a capacitive touch interface. In some such examples, a user can control various operating parameters of the humidifier, such as a mist emission level, via the interface 230. For instance, in some embodiments, the lens 232 includes a touch sensor 233, for example, including one or more capacitive regions, that can be used to detect the touch of a user. In other embodiments, such one or more capacitive regions can be positioned proximate the lens 232 so that the touch sensor 233 can detect a user touching the lens 232 proximate the one or more capacitive regions. Inputs received from the interface 230 can be communicated to a controller, for example, in the base portion (not shown) of the humidifier 200, for controlling operation of various aspects of the humidifier.

The interface includes an isolation interface 238 between the board 236 and the interior of the liquid tank 202. The isolation interface 238 can protect electrical components (e.g., light emitting sources on board 236, capacitive sensing elements, etc.) in the interface 230 from liquid in the liquid tank 202. In some embodiments, the isolation interface 238 comprises a space to provide isolation between the liquid in liquid tank 202 and the other components of interface 230. In various embodiments, the space can comprise a vacuum, or can be filled with air, electrically insulating materials (e.g., plastic), electrically shielding materials (e.g., metals), or combinations thereof.

Such isolation can minimize the impact of the liquid on operation of the electrical components of the interface 230. For example, as described, in some embodiments, the interface 230 includes capacitive sensing elements configured to detect the touch of a user. However, in some such examples, such capacitive sensing elements can be impacted by any of a variety of objects proximate the capacitive sensing elements can impact the capacitance of the sensing elements, including liquid in the liquid tank 202. For instance, in an exemplary configuration, if the capacitive sensing elements are not isolated from the liquid in liquid tank 202, liquid being incident on a portion of the interface 230 can be misinterpreted as a user touching a similar portion of the interface 230 (e.g., at a similar position along the length of the interface). Such false sensing of a user touch could lead to undesirable operation of the humidifier 200. Isolation interface 238 can be configured to isolate the liquid in the liquid tank 202 to prevent the liquid from impacting operation of the interface 230. In particular, in some examples, isolation interface 238 provides electrical isolation to prevent the electrical properties of the liquid from impacting operation of capacitive sensing elements in the interface 230.

The humidifier 200 of FIG. 2 further includes a liquid level sensor 240 capable of detecting an amount of liquid present in the liquid tank 202. In some examples, the liquid level sensor 240 includes a first portion 242 and a second portion 244 which can be used for sensing the liquid level in liquid tank 202. In some embodiments, the first portion 242 and the second portion 244 of the liquid level sensor 240 can be used in conjunction to measure a liquid level. Additionally or alternatively, one of the first 242 and second 244 portions of the liquid level sensor 240 can be used to calibrate the other.

As shown, in the illustrated example of FIG. 2, the interface 230 and the liquid level sensor 240 are positioned approximately flush with the sidewall 208 of the humidifier 200. In some examples, one or both of the interface 230 and the liquid level sensor 240 are integrally formed into the sidewall 208. In other examples, one or both of the interface 230 and the liquid level sensor 240 can be positioned in a recess or cutaway from the sidewall 208.

Figure 3:
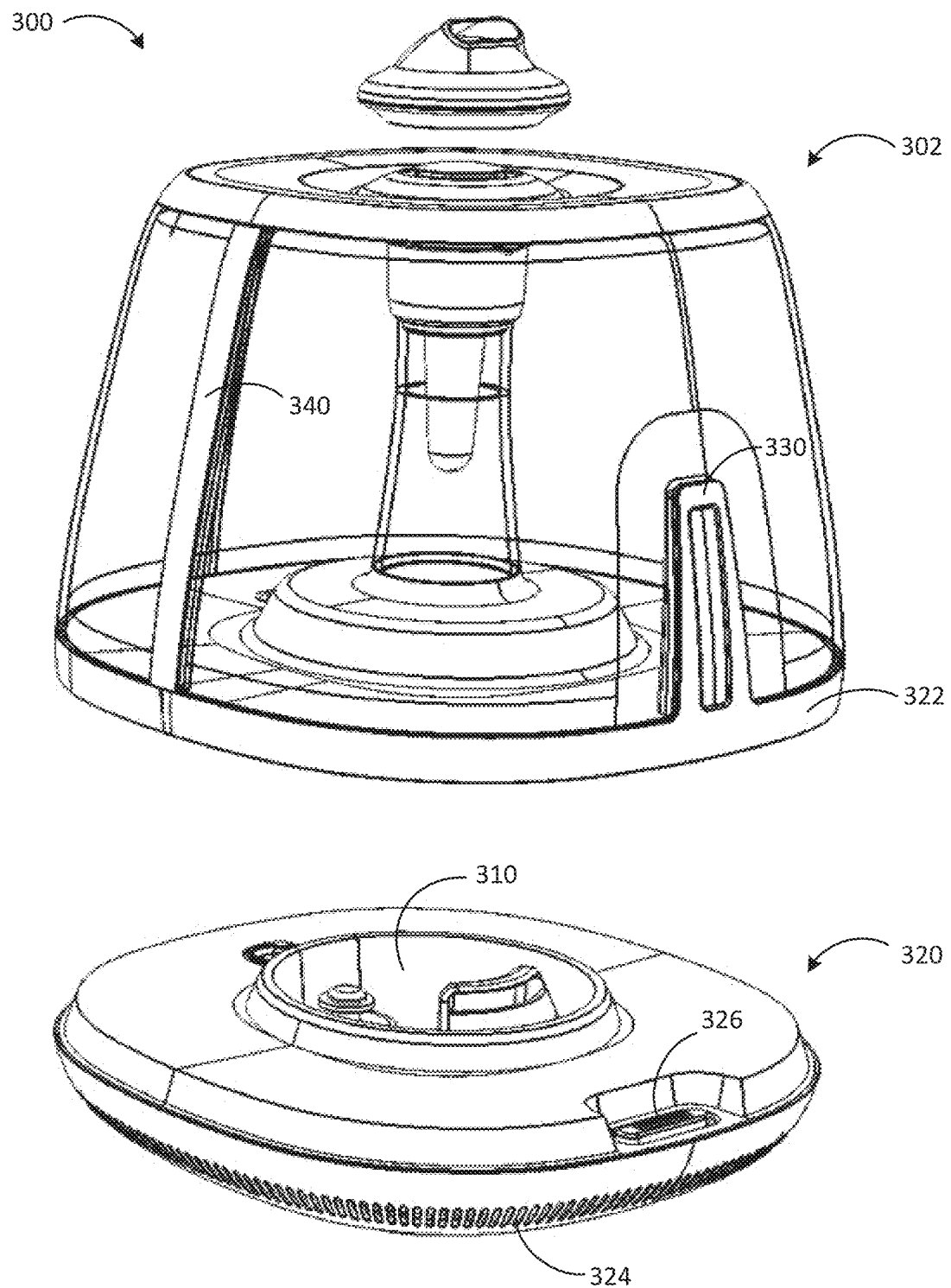
FIG. 3 shows a perspective view of an exemplary humidifier in which the liquid tank is removed from the base portion.

FIG. 3 shows a separated, perspective view of an exemplary humidifier in which the liquid tank 302 is removed from the base portion 320. In this embodiment, mate ring 322, interface 330, and liquid level sensor 340 are included with the liquid tank 302. As noted above and shown here, the base portion 320 includes a reservoir 310, which can be used for storing liquid to be atomized during operation of the humidifier 300. As described elsewhere herein, in some examples, the base portion 320 includes components such as a power supply, controller, liquid atomizer, fan, valve, and the like. Some such components can be housed by the base portion 320. In some examples, components housed in the base portion 320 can be enclosed by vent 324 to allow air cooling of such components. In other embodiments, vents 324 may be omitted, such as shown in FIG. 1B, if cooling is not required or is provided another way. For instance, in some embodiments, vents substantially surrounding the perimeter of the base portion 320 may be omitted. However, in some such examples, openings can be positioned elsewhere in the base portion 320 (e.g., on a bottom surface) in order to permit air intake for atomizer fan operation. The reservoir 310 can be sealed from other portions of the base portion 320 so that fluid does not escape the reservoir 310 and interact with components such as a controller and/or a power supply.

In the example of FIG. 3, the base portion 320 includes a lower connector 326. In some examples, lower connector 326 is configured to mate with a corresponding connector on the mate ring 322. In some such examples, lower connector 326 can be in communication with various components housed in the base portion 320 such that, when connected with a corresponding connector (e.g., on a liquid tank), can facilitate communication between such components and the mate ring 322. Mate ring 322 can be in communication with, for instance, the interface 330 and/or the liquid level sensor 340. Thus, in some examples, lower connector 326 can facilitate communication between components in the base portion 320 (e.g., a controller and/or a power supply) and the liquid level sensor 340 and/or the interface 330.

In some embodiments, a humidifier 300 can include one or more magnets can be used to enhance the engagement (e.g., the strength and/or accuracy of the engagement) between the lower connector 360 and a corresponding connector (e.g., on tank 302). For example, one or more magnets can be positioned on the base portion 320 proximate the lower connector 326 to engage one or more corresponding magnets or magnetically susceptible portions of the liquid tank 302 to improve the connection between such components.

Additionally or alternatively, in some embodiments, some or all of the interfacing portions of the base portion 320 and the liquid tank 302 can include one or more compressible materials, such as rubber. Such material(s) can be effective to enhance sealing between one or more locations of the interface and/or to reduce vibrations at one or more locations. For instance, in some examples, the lower connector 326 and/or a corresponding connector in the liquid tank 302 (e.g., in the mate ring 322) can be suspended in a compressible material to reduce the impact of any vibrations on the connections between the base portion 320 and the tank 302.

Figure 4:
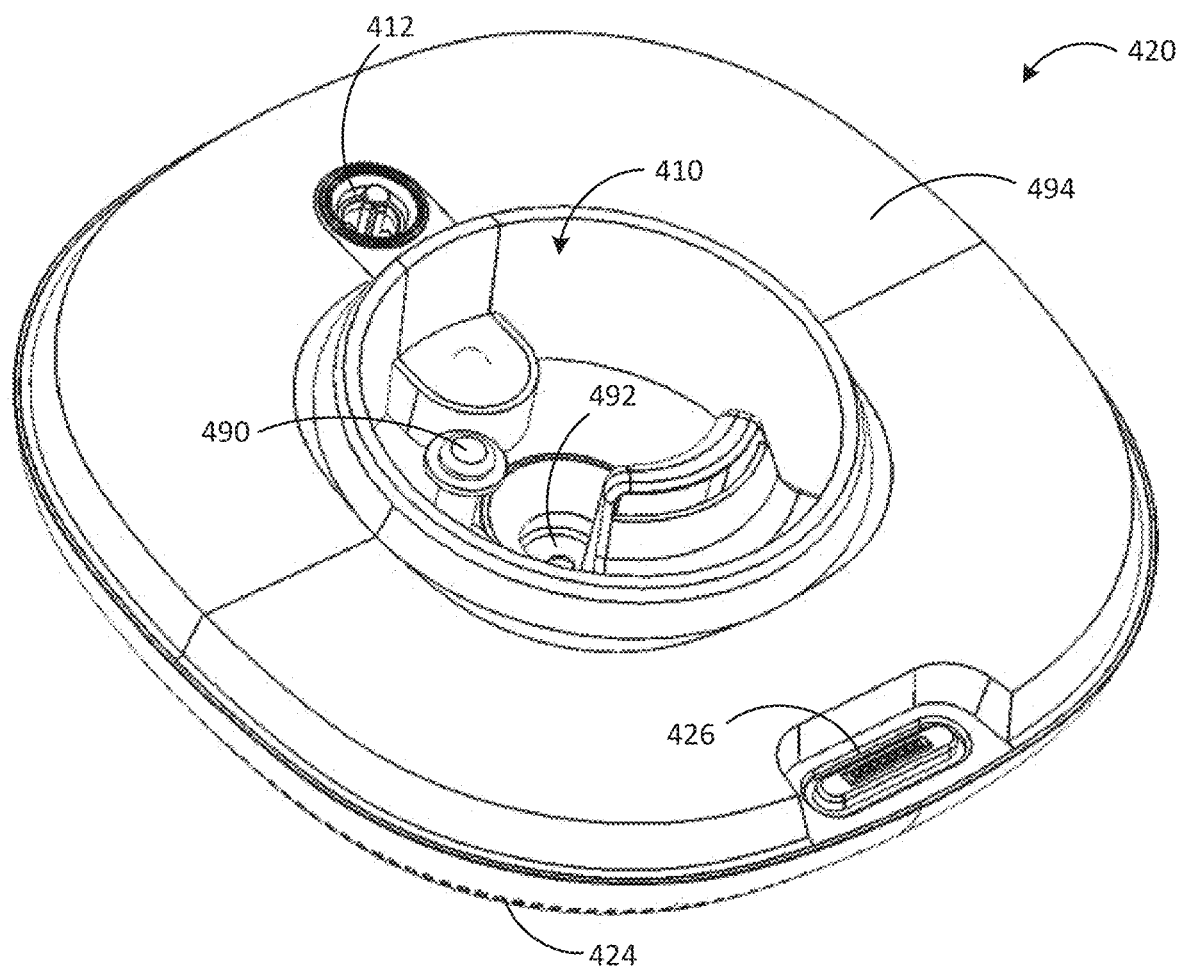
FIG. 4 shows a perspective view of a base portion of an exemplary humidifier.

FIG. 4 shows a perspective view of a base portion of an exemplary humidifier. In the example of FIG. 4, base portion 420 includes a reservoir 410 configured to hold liquid for being atomized. As described with respect to FIG. 1A, a valve 412 can facilitate the addition of liquid to the reservoir 410, for example, from a liquid tank (not shown). A reservoir level sensor 490 can be used to provide information regarding the amount of liquid present in the reservoir 410, for example, using a float mechanism and a Hall Effect sensor. An atomizer 492 can be used to atomize liquid within the reservoir 410 for emission into an environment (e.g., as a mist).

In some examples, the base portion 420 includes a housing, generally shown as 494. In some embodiments, housing 494 at least partially defines the boundary of the reservoir 410 and prevents liquid from escaping into other portions of the base portion 420. In some such examples, the housing 494 can further enclose additional components, such as a controller and/or a power supply (not shown). In some examples, the housing 494 includes vent 424 to allow air to flow into an area defined by the housing, for example, to facilitate air cooling of various components. In other examples, vent 424 may be omitted, such as shown in FIG. 1B.

The base portion 420 of FIG. 4 includes a lower connector 426. In various examples, the lower connector 426 can be in electrical communication with one or more components in the base portion 420, including, for example, a power supply and/or a controller. In some such examples, the lower connector 426 can be used to facilitate electrical communication between various portions of the humidifier.

Figure 5:
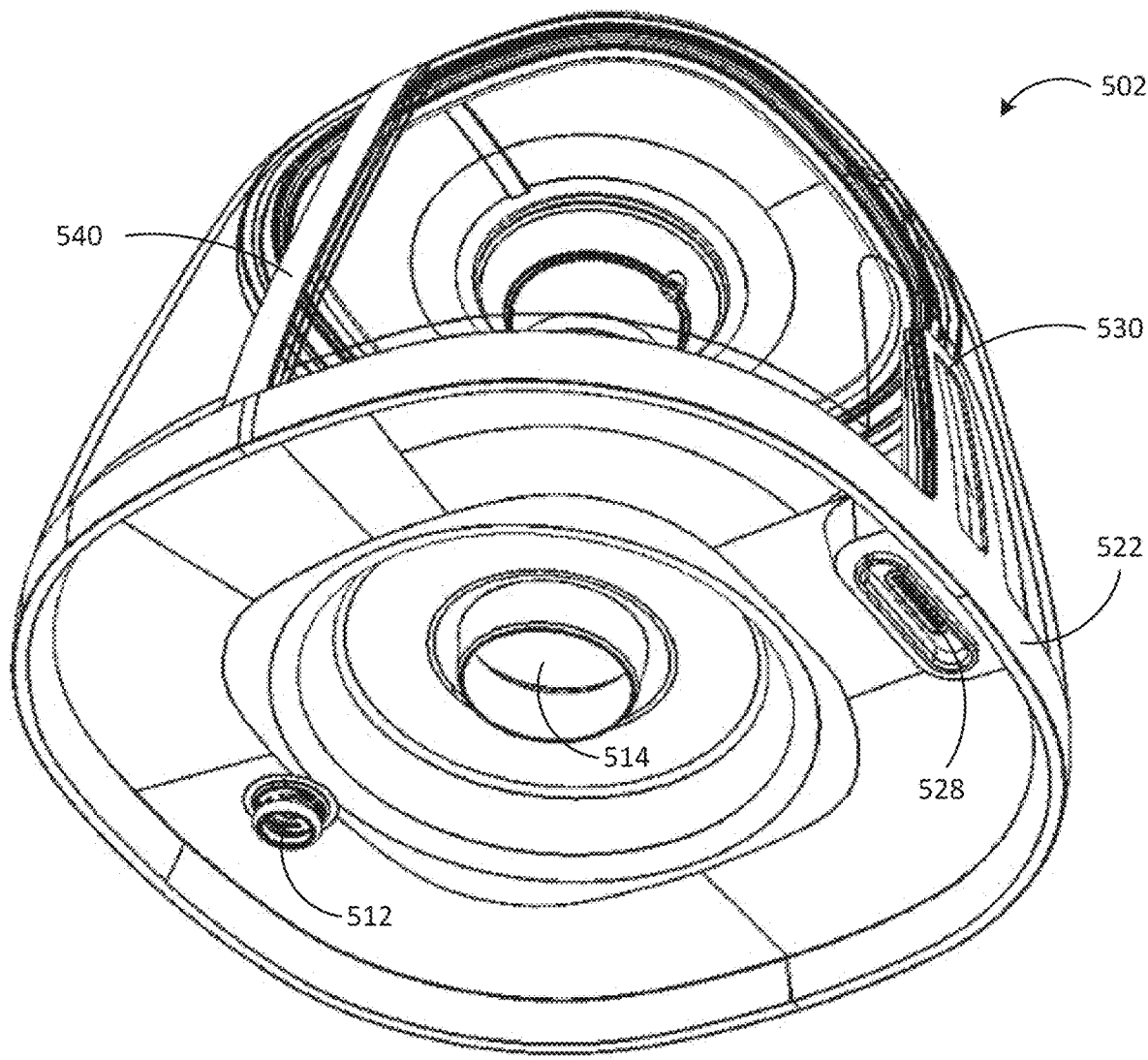
FIG. 5 shows the underside of an exemplary liquid tank.

FIG. 5 shows a perspective view of an underside of an exemplary liquid tank. The liquid tank 502 of FIG. 5 includes a mate ring 522, an interface 530, and a liquid level sensor 540 as described elsewhere herein. The liquid tank 502 includes a column 514 through which mist (e.g., water) can be emitted (e.g., from a base portion) into the ambient environment. Valve 512 can facilitate the transferring of liquid from the liquid tank 502 to other portions of the humidifier (e.g., into a base portion reservoir).

The liquid tank 502 of FIG. 5 further includes an upper connector 528. In some examples, the upper connector 528 is configured to mate with another connector (e.g., lower connector 426 of FIG. 4) to facilitate communication between various components. In some embodiments, the mate ring 522 includes communication channels configured to provide electrical communication between the upper connector 528 and other system components, such as the interface 530 and/or the liquid level sensor 540. In some such examples, communication channels comprise electrically conductive channels, such as wires disposed in the mate ring 522.

As described elsewhere herein, in some examples, the liquid tank 502 can include an attachment mechanism, such as a magnet, to facilitate connection between the liquid tank 502 and a base portion, such as between upper connector 528 and lower connector 426 in FIG. 4. In some embodiments, one or more magnets can be positioned proximate upper connector 528 in order to help secure the upper connector 528 to a corresponding lower connector (e.g., 426 in FIG. 4). Additionally or alternatively, upper connector 528 can be supported by a compressible material, such as rubber, in order to improve sealing around the connector and/or to reduce the impact of any tank vibrations on connections between the upper connector 528 and a corresponding lower connector.

In various embodiments, different components (e.g., interface 530, liquid level sensor 540) can communicate with different numbers of communication channels depending on the needs of such components. In some embodiments, the upper connector 528 (and corresponding lower connector) includes as many individual isolated connections (e.g., via pins, etc.) as there are separate electrical channels provided by mate ring 522. In some alternative embodiments, the mate ring 522 provides communication channels for communication between the upper connector 528 and some, but not all, of available components. For instance, in an exemplary embodiment, interface 530 is in direct communication with upper connector 528 without requiring one or more communication channels in the mate ring 522.

Figure 6:
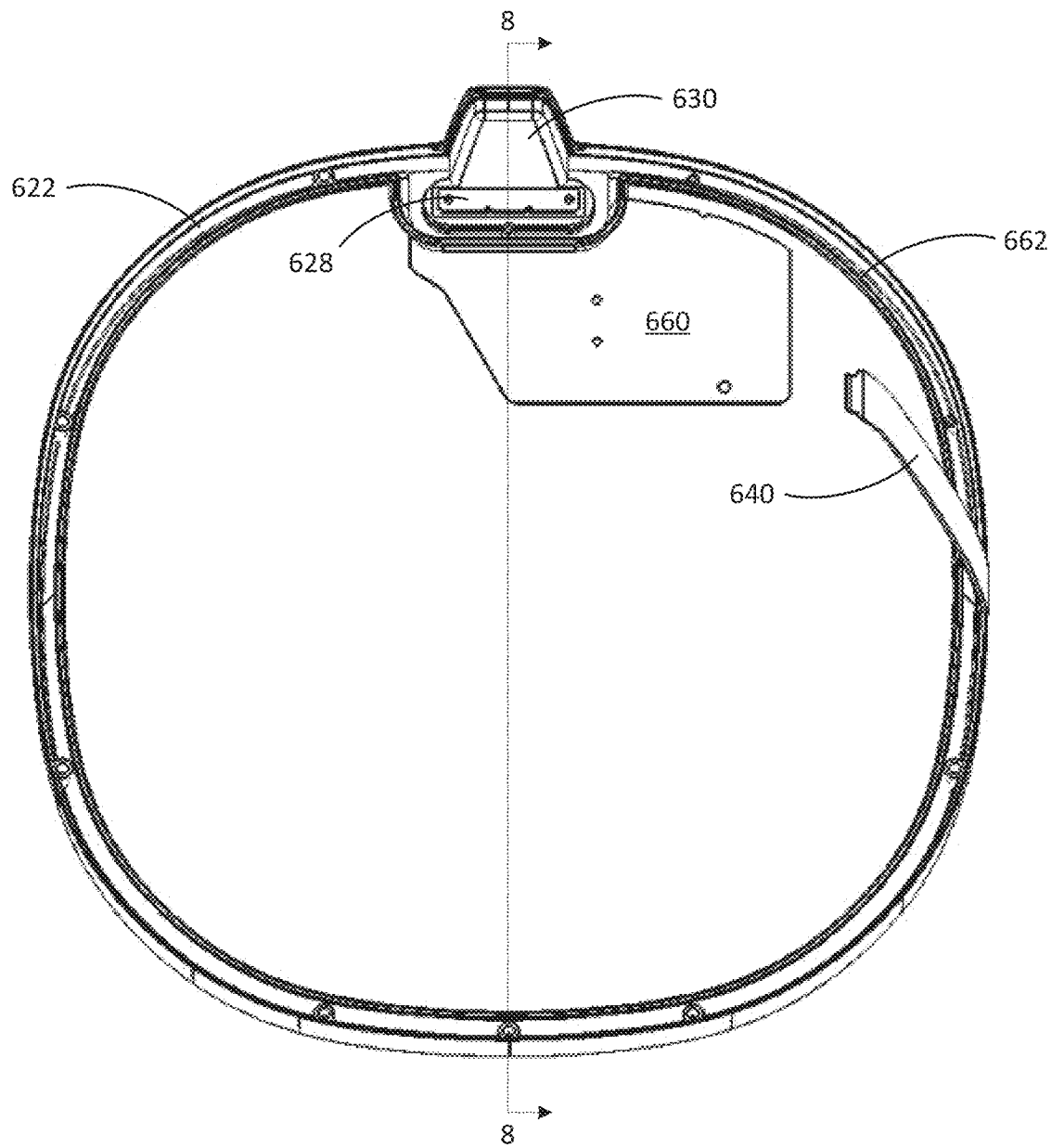
FIG. 6 is a perspective view of a mate ring, including an interface and liquid level sensor.

FIG. 6 is a perspective view of a mate ring, including an interface and liquid level sensor. In the example of FIG. 6, a mate ring 622 is coupled to an interface 630 and a liquid level sensor 640. A connector 628 facilitates communication between portions of the mate ring 622 and a circuit board 660. In some embodiments, circuit board 660 can include various system components, such as a power supply, a controller, and the like, and can be housed in the base portion of a humidifier. In other examples, circuit board 660 can include some such components, such as a controller, and be in communication with other base portion components, such as a power supply (e.g., a power supply board) from which power is supplied to the circuit board 660. Power and/or data can be communicated between circuit board 660 and the mate ring via connector 628.

In some examples, interface 630 receives power and/or data directly from connector 628. Additionally or alternatively, mate ring 622 can include communication channels 662 (e.g., conductive channels) for facilitating transmission of signals between the circuit board 660 and system components such as the interface 630 and/or the liquid level sensor 640. In various embodiments, communication channels 662 can include electrical communication channels (e.g., electrically conductive wires), optical communication channels (e.g., fiber optics), or other appropriate communication devices.

Figure 7A:
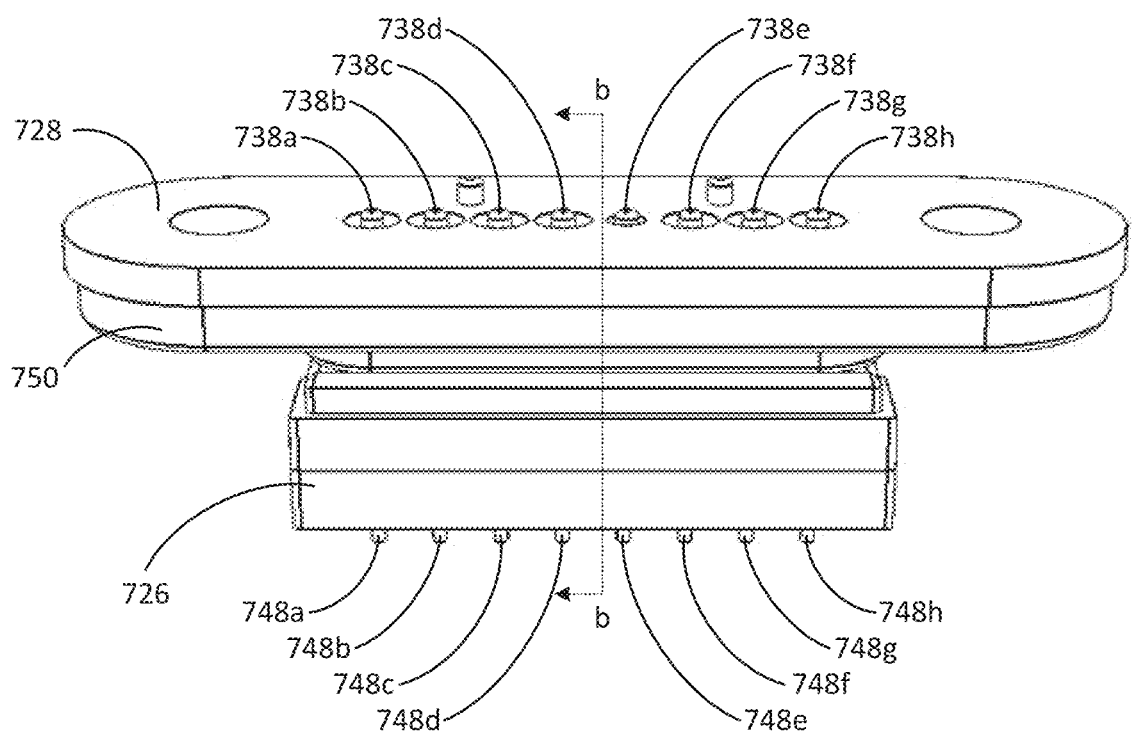
FIG. 7A shows an exemplary view of the coupling of a lower connector and an upper connector.

As described, connectors can facilitate communication between various portions of the humidifier, for example, between a circuit board (e.g., 660) housed in the base portion and an interface and/or liquid level sensor proximate the liquid tank. FIG. 7A shows an exemplary view of the coupling of a lower connector and an upper connector. In the illustrated example, the upper connector 728 includes a plurality of pins 738a-738h and the lower connector 726 includes a corresponding plurality of pins 748a-748h. In some examples, pins 738a-738h of the upper connector 728 can engage corresponding pins 748a-748h of lower connector 726 to secure the upper connector 728 and lower connector 726 together. In some embodiments, when connected, pins 738a-738h are in electrical communication with pins 748a-748h. In such configurations, electrical signals can be communicated between components in the base portion and components in and/or proximate the liquid tank via pins 738a-738h and 748a-748h. Additionally or alternatively, pins 738a-738h and 748a-748h can be used to facilitate other types of communication, such as optical communication, between components in the system. In some exemplary configurations, a gasket 750 can facilitate a liquid-tight seal around the connection between the upper connector 728 and the lower connector 726 to prevent liquid from interfering with communication, such as electrical communication, between the connectors.

Figure 7B:
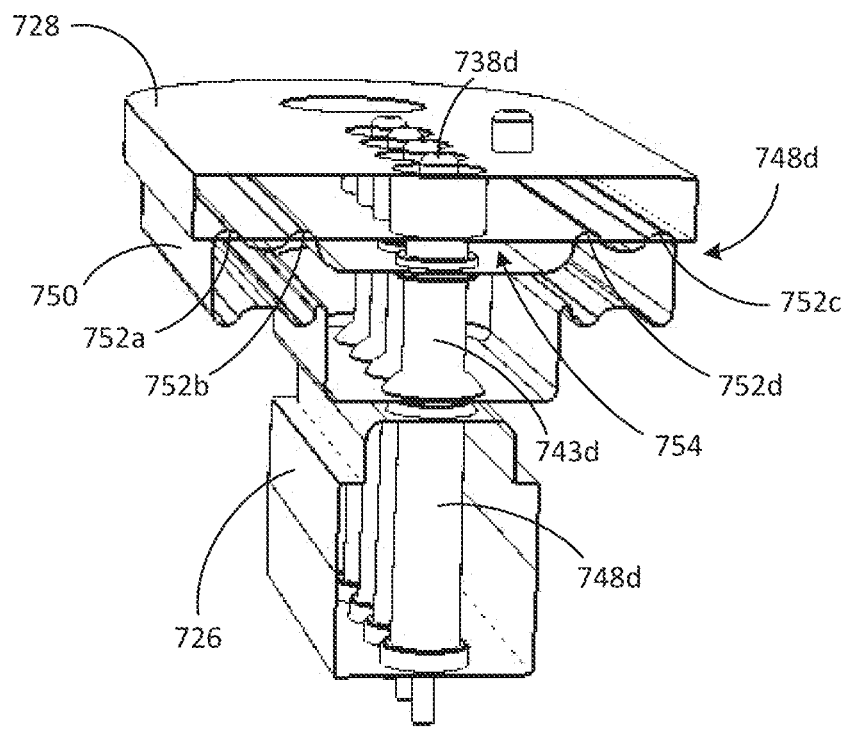
FIG. 7B is a cross-sectional view of a coupling between connectors taken along line b-b in FIG. 7A.

FIG. 7B is a cross-sectional view of a coupling between connectors taken along line b-b in FIG. 7A. FIG. 7B shows, as an illustrative example, pin 738d of upper connector 728 in communication with pin 748d of lower connector 726. Gasket 750 surrounds the connection between the upper connector 728 and the lower connector 726 to protect the points of connection, for example, from liquid present in the humidifier. In various examples, the gasket 750 could be integrally formed into the upper connector 728 or the lower connector 726. In other examples, the gasket 750 can be separate from both the upper 728 and lower 726 connectors.

In some examples, connection between the upper 728 and lower 7265 connectors occurs proximate space 754 between the gasket 750 and the upper connector 728. In some such examples, this location is most susceptible to interference, for example, by liquid in the humidifier. In some examples, gasket 750 includes ridges (e.g., 752a-752d) surrounding or partially surrounding the perimeter of the connection. For instance, in some embodiments, ridges 752a and 752c are portions of the same ridge surrounding the gasket 750. The ridges 752a-752d can provide a seal between the top surface of the gasket 750 and the bottom surface of the upper connector 728 to prevent liquid or other contaminants from entering space 754 and potentially disrupting communication between the lower 726 and upper 728 connectors. While shown as providing a seal between against a surface on the upper connector 728 in FIG. 7B, in various embodiments, gasket 750 can additionally or alternatively include ridges configured to abut an upper surface of the lower connector 726.

In some embodiments, gasket 750 surrounds the connection between the upper connector 728 and the lower connector 726 without engaging pins (e.g., 738d, 748d). In other examples, gasket 750 comprises connecting channels (e.g., 743d) to facilitate communication between the upper connector 728 and lower connector 726. For example, in the exemplary configuration of FIG. 7B, intermediate connector 743d is in communication with lower pin 748d and upper pin 738d. In some examples, such intermediate connectors can be integrated into gasket 750. In other examples, connector 743d can be a portion of upper pin 738d or lower pin 748d extending into the gasket 750, for example, via a liquid-tight opening.

Figure 7C:
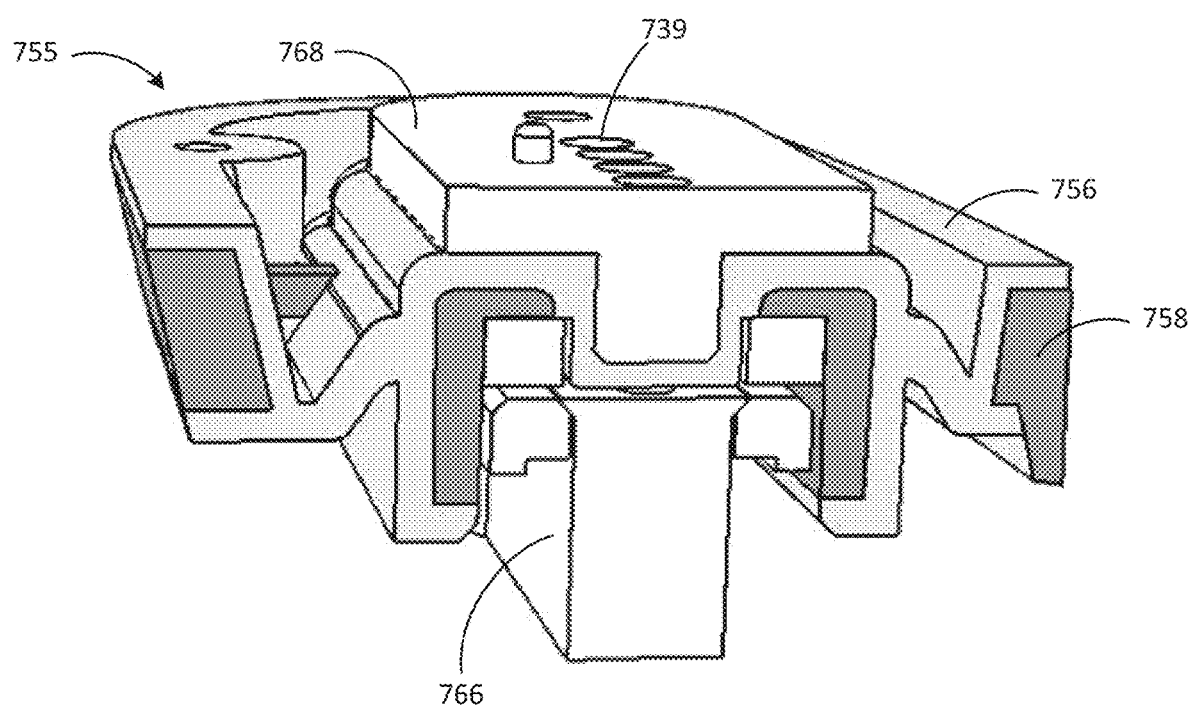
FIG. 7C shows a cross-sectional view of a coupling between alternative upper and lower connectors.

FIG. 7C shows an exemplary view of an alternative coupling of a lower connector and an upper connector. In the illustrated example, and upper connector 768 can interface with a lower connector 766 to allow communication between components in the base portion of the humidifier and components in the liquid tank. In the exemplary embodiment of FIG. 7C, the upper connector 768 can house one or more pins, for example, in opening 739, to interface with corresponding pins housed in the lower connector 766.

The coupling shown in FIG. 7C includes a compressible surrounding 755 supporting one or both of the upper connector 768 and the lower connector 766. In some embodiments, the compressible surrounding 755 is configured to support the upper connector 768 relative to the liquid tank and/or support the lower connector 766 to base portion. In some embodiments, the compressible surrounding can include a compressible material, such as rubber. In some such examples, the compressible material can act to suppress vibrations experienced by the humidifier (e.g., due to fan or atomizer operation, external vibration sources, etc.) from impacting the connection between upper connector 768 and lower connector 766 (e.g., via pins). Additionally or alternatively, the compressible material can improve the sealing ability of the surrounding 755 to keep liquid or other contaminants from reaching the connection interface between the upper connector 768 and the lower connector 766.

In some embodiments, the compressible surrounding 755 can include separate compressible components 756 and 758, shaded in light and dark gray, respectively, in FIG. 7C. In some such examples, the separate components 756 and 758 can interface with the upper connector 768 and the lower connector 766, respectively to provide each such connector with vibration insulation from the humidifier. In some such examples, separate components 756 and 758 can be made from different materials or can be made from the same material. In some embodiments, compressible components 756 and 758 can be integrated into a single compressible component having sections (e.g., demarcated by shaded areas 756 and 758) that can be made from the same or different materials.

FIG. 8 is a cross-sectional view of the mate ring and other components taken along line 8-8 in FIG. 6. In the example of FIG. 8, mate ring 822 is coupled to interface 830 and liquid level sensor 840. An upper connector 828 can be in communication (e.g., electrical communication) with the interface 830 and/or the liquid level sensor 840, for example, via one or more communication channels (e.g., channel 862 shown in a broken line). The upper connector 828 can communicate (e.g., electrically) with a lower connector 826, for example, by way of one or more connecting pins (e.g., 738*d* and 748*d* of FIG. 7B). As described with respect to FIGS. 7A and 7B, a gasket 850 can provide a liquid-tight seal between the upper connector 828 and the lower connector 826 so that liquid from the humidifier does not interfere with electrical communication between the connectors.

In the example of FIG. 8, the lower connector 826 is coupled to a circuit board 860 by one or more connecting pins 848. The circuit board 860 can include any number of components for use in operating various portions of the humidifier. For example, in some embodiments, circuit board 860 can include or otherwise be in communication with a controller and/or a power supply for communicating with and providing power to interface 830 and/or liquid level sensor 840.

Interface 830 of FIG. 8 includes a light pipe 834 into which light can be emitted for presenting to a user via transmission through one or more lenses 832. In some examples, a board 836 can include one or more light sources, such as LEDs, that are positioned to emit light into the light pipe. In some examples, signals and power for lighting such light sources can be provided to the interface 830 from the circuit board 860 via pins 848, lower connector 826, and upper connector 828.

As described elsewhere herein, lens 832 can include a touch sensor 833 to receive touch input signals from a user. In some examples, inputs received via the touch sensor 833 can be communicated to a controller located in the base portion of the humidifier (not shown) via the upper connector 828, lower connector 826, pins 848, and circuit board 860. As described elsewhere herein, an isolation interface 838 can protect internal elements of the interface 830 and minimize interference from liquid in the liquid tank.

Figure 9:
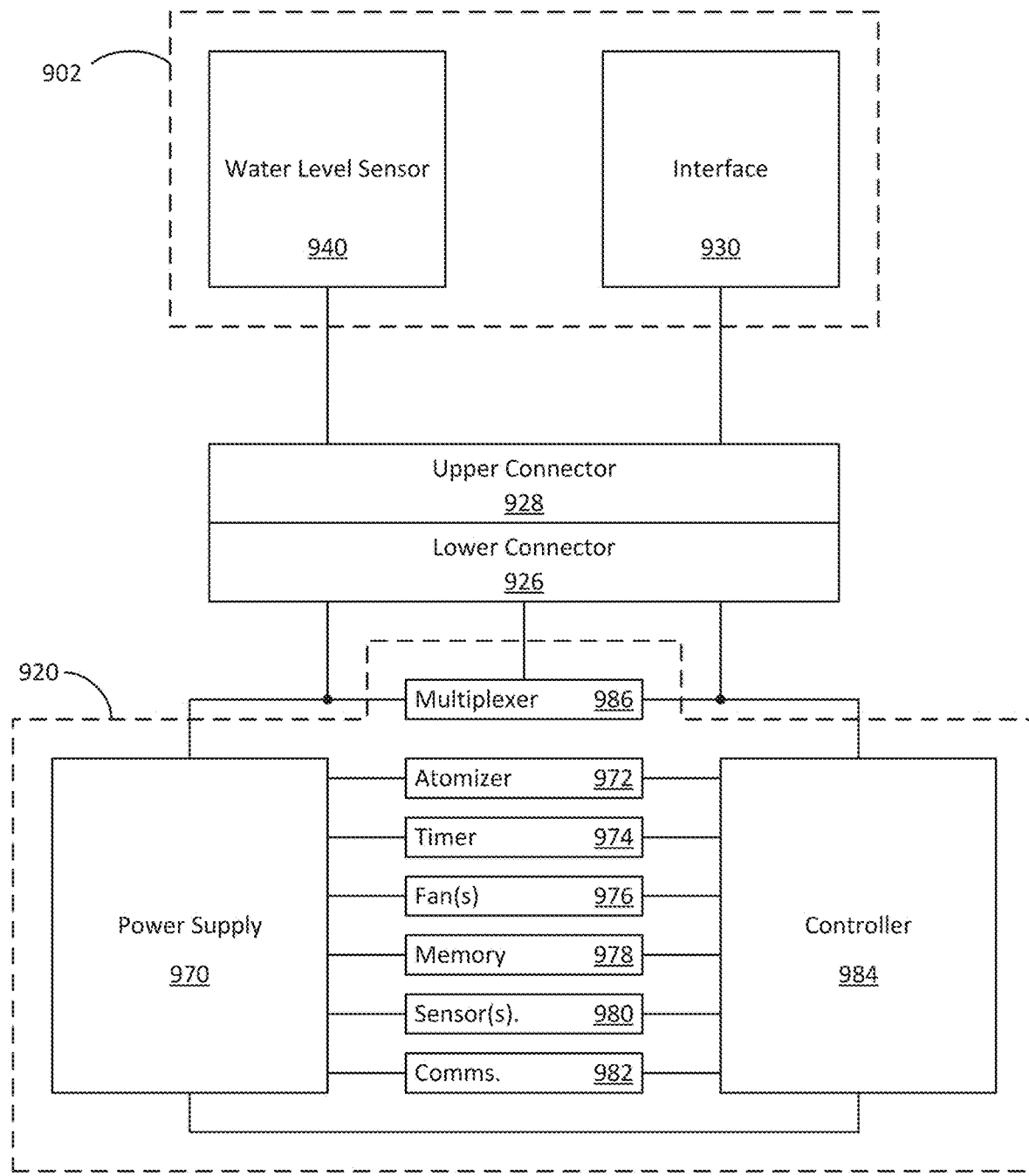
FIG. 9 is a schematic diagram showing exemplary communication between various system components within a humidifier.

FIG. 9 is a schematic diagram showing exemplary communication between various system components within a humidifier. In the illustrated embodiment, a liquid tank 902 includes a tank water level sensor 940 and an interface 930. As described elsewhere herein, tank water level sensor 940 and/or interface 930 can be embedded into, formed into, and/or supported by a sidewall of the liquid tank 902. As described elsewhere herein, in some examples, one or more of such components (e.g., tank water level sensor 940) can be isolated from the environment exterior to the humidifier to prevent undesired detection of external electric fields and/or touch from a user.

The example of FIG. 9 further includes a base portion 920 including a power supply 970 and a controller 984. As described elsewhere herein, such components can be housed in the base portion of the humidifier. For instance, with reference to FIG. 1A, power supply 970 and/or controller 984 can be housed within base portion 120*a*, behind vents 124. With reference to FIG. 8, power supply 970 and/or controller 984 can be supported by circuit board 860.

The base portion 920 further includes additional humidifier components, such as an atomizer 972, a timer 974, one or more fans 976, a memory 978, one or more sensors 980 (e.g., a temperature sensor, humidity sensor, etc.), and a communication interface 982. Such components may be used during various operations of the humidifier. For instance, in some exemplary embodiments, atomizer 972 and one or more fans 976 operate together to create mist from liquid stored in a reservoir and subsequently expel the mist from the humidifier. Memory 978 can be used to store operating instructions for the controller 984 and/or data collected during various humidifier operations. Additionally or alternatively, controller 984 can receive data from one or more sensor(s) 980 representative of one or more characteristics of the humidifier environment, such as surrounding air temperature, humidity, and the like. In various examples, components such as timer 974 and/or memory 978 may be integrated into controller 984 or may be stand-alone components (e.g., on circuit board 860 in FIG. 8).

According to the exemplary configuration of FIG. 9, the controller 984 is in communication with the atomizer 972, timer 974, fan(s) 967, memory 978, sensor(s) 980, communication interface 982, and lower connector 926. The lower connector 926 can facilitate communication with the tank water level sensor 940 and/or the interface 930 by way of the upper connector 928. While shown as being in communication with the tank water level sensor 940 and the interface 930 via the lower connector 926 and upper connector 928, in some examples, the controller 984 can communicate with one or both of the tank water level sensor 940 and the interface 930 directly, for example, via a wireless communication (e.g., a Bluetooth® connection).

In various embodiments, controller 984 can include any component or combination of components capable of receiving data (e.g., a user-selected mist emission setting via the user interface, liquid level data via the liquid level detector, sensor data from or more sensors 980, etc.) from one or more system components. The controller 984 can be further configured to analyze the received data, and perform one or more actions based on the analyzed data. In various examples, controller 984 can be embodied as one or more processors operating according to instructions included in a memory (e.g., memory 978), such as a non-transitory computer-readable medium. Such memory can be integral with the controller 984 or separate therefrom. In other examples, such a controller 984 can be embodied as one or more microcontrollers, circuitry arranged to perform prescribed tasks, such as an application-specific integrated circuit (ASIC), or the like.

In some embodiments, the controller 984 can be configured to communicate with other humidifier components in any of a variety of ways, such as via wired or wireless communication (e.g., via lower connector 926 and upper connector 928). In some examples, the controller 984 can communicate with one or more components via an I2C connection, a Bluetooth® connection, or other known communication types. In various embodiments, controller 984 can be embodied as a plurality of controllers separately in communication with different system components. Such controllers can be programmed to operate in concert (e.g., according to instructions stored in a single memory or communicating memories), or can operate independently of one another.

For example, in various embodiments, the controller 984 can be in one- or two-way communication with various components of the humidifier, such as the atomizer 972, the timer 974, the interface 930, and/or the tank water level sensor 940. For example, as described elsewhere herein, in some embodiments, the controller 984 can be configured to receive data from the interface 930 and control operation of the atomizer 972 based upon programming instructions. In another example, controller 984 can control a display on the interface 930 (e.g., one or more LEDs) based on a received input (e.g., from the interface 930). It will be appreciated that various examples are possible, some of which are described herein by way of example.

In some embodiments, the communication interface 982 can facilitate communication between one or more humidifier components (e.g., controller 984) and one or more external components via a wired connection and/or a wireless connection, such one or more of a WiFi® connection, a Bluetooth® connection, or the like. In some such embodiments, the controller 984 can be accessed via the communication interface 982 such that a user can adjust one or more settings of the controller 984 via an external or remote device. Similarly, such access to the controller 984 can be used to control operation of the humidifier, such as a desired amount of mist emission or the like, in addition to or instead of other interfaces (e.g., interface 930). In some such examples, a user can interface with the communication interface 982 of the humidifier via, for example, a web interface and/or an application running on the user's mobile device, such as a smartphone, tablet, or the like, for example, as described in U.S. patent application Ser. No. 15/665,616, titled "Humidifier User Interaction", which is incorporated into this disclosure by reference above.

In some embodiments, the controller 984 can additionally or alternatively be in communication with one or more external devices, for example, via communication interface 982. In some such examples, the controller can receive data from one or more sensors external to or built-in to the humidifier, for example, via wired or wireless connection, such as Ethernet, Bluetooth®, Wi-Fi®, etc. Some such sensors can be used for measuring different aspects of the ambient environment of the humidifier, such as a temperature sensor, humidity sensor (e.g., a hygrometer), or the like. In some such examples, the controller 984 can perform one or more operations according to received data from external sensors. In some embodiments, remotely located components such as a humidity sensor, temperature sensor, or the like can be used to measure various parameters regarding the ambient environment surrounding the humidifier. In some such examples, there is no need to sample surrounding air in the humidifier itself, and the humidifier base portion can be made without vents (e.g., base portion 120*b* in FIG. 1B), which reduces the likelihood of excess liquid from undesirably entering the base portion of the humidifier.

In the illustrated example, power supply 970 is in communication with a variety of components in the base portion 920 as well as lower connector 926. The lower connector 926 is in communication with an upper connector 928, for example, via a press-fit connection. One or more gaskets can be used to seal the connection between the upper connector 928 and the lower connector 926. The upper connector 928 is in communication with the tank water level sensor 940 and the interface 930. Thus, in various embodiments, the power supply 970 can provide electrical power to various components in the base portion 920, such as the atomizer 972, timer 974, fan(s) 976, sensor(s) 980, communication interface 982, controller 984, as well as other components. Further, power supply 970 can provide electrical power to components proximate the liquid tank 902, such as the tank water level sensor 940 and the interface 930, by way of the upper connector 928 and lower connector 926.

In various embodiments, power supply 970 can include one or more sources of electrical power, such as one or more batteries, capacitive energy storage devices, or the like. Additionally or alternatively, power supply 970 can include a wired power supply, for example, a plug capable of plugging into an outlet. In some embodiments, the power supply 970 receives electrical power from a power source (e.g., a wall outlet) and outputs an appropriate electrical power to various humidifier components as needed during operation of the device. For instance, in some examples, power supply 970 may provide a first voltage to interface 930 and a second voltage to operate controller 984. In other examples, each component in the humidifier can operate at approximately the same voltage output from power supply 970. In still further examples, power supply 970 can include a plurality of power-supplying components for providing different amounts of electrical power to different components. For instance, in some embodiments, power supply 970 can include a power board having a plurality of outputs for providing power to various system components. In some embodiments, power supplied to various components within the humidifier are independent from one another so that any short circuit condition (e.g., due to liquid ingress) in the power supplied to one portion of the humidifier does not impact the power supplied elsewhere.

In the embodiment of FIG. 9, the base portion further includes a multiplexer 986 in communication with the power supply 970, the controller 984, and the lower connector 926. As described elsewhere herein, in some embodiments, the multiplexer 986 can be used to perform a fault check analysis of the humidifier to ensure that the lower connector 926 and upper connector 928 are properly connected and the system components are in good working order. In an exemplary embodiment, the power supply 970 can provide electrical power to the multiplexer 986, which can be controlled by and output a signal to the controller 984. In some examples, the controller can read the signal on each pin of the lower connector 926 via multiplexer 986 and compare the signal on each pin to an expected value. If one or more pins provide an unexpected signal to the controller 984, the controller can detect a fault condition on the humidifier. In some embodiment, the controller 984 can disable operation of the humidifier based on a detected fault condition. Additionally or alternatively, the controller 984 can diagnose the fault condition based on the signals received from the multiplexer 986 and indicate one or more faults to the user, for example, via interface 930 or one or more external components via communication interface 982.

Figure 10:
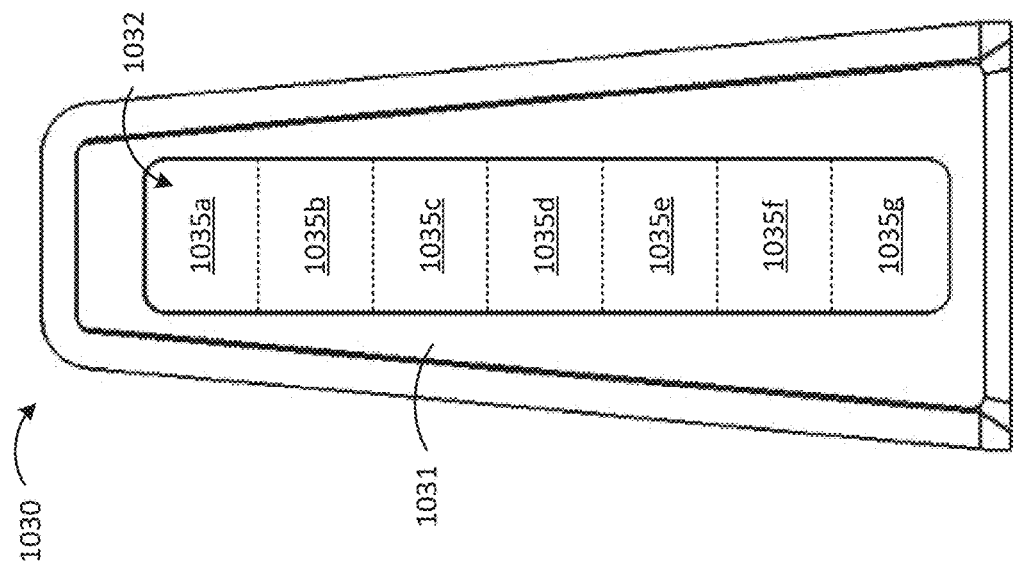
FIG. 10 shows a schematic representation of an exemplary interface for a humidifier.

FIG. 10 shows a schematic representation of an exemplary interface for a humidifier. In the example of FIG. 10, interface 1030 includes a lens 1032 and a face 1031 surrounding the lens 1032. As described, for example, with respect to FIG. 2, the interface 1030 can include a light pipe (not shown) behind lens 1032 in which light can be emitted for presentation to a user, for example, via lens 1032. In some examples, the interface 1030 comprises a plurality of light sections 1035a-1035g, one or more of which can selectively and independently be illuminated via a light source (e.g., one or more LEDs). For instance, in some such embodiments, each section 1035a-1035g can be illuminated individually from the others. That is, for example, section 1035e can be illuminated via a light source while section 1035d is not illuminated.

In various embodiments, each section 1035a-1035g of the interface can include one or more light sources capable of emitting one or more colors of light via each respective section. For instance, in some examples, one or more such sections include a plurality of different colored LEDs (e.g., red, green, and blue LEDs) that can be selectively activated within each section to produce a customized color (e.g., an RGB color) to be displayed at that section. In some examples, the color of each such section can be individually controlled, for example, via the controller.

Additionally or alternatively, in some examples, one or more sections 1035a-1035g is only selectively illuminated as a single color. In various embodiments, such a single color can be emitted at a variable intensity (e.g., as controlled by the controller). In other examples, a section having the single color light output can function as a binary section, for example, having only operating states of "on" and "off."

During exemplary operation, a user may interact with interface 1030 in order to control operation of a humidifier. For instance, in an exemplary embodiment, sections 1035a-1035g correspond to different operating levels of the humidifier, for example, different amounts of mist expelled from the humidifier. To select a level of operation, a user may touch the interface at a level corresponding to a desired level of operation (e.g., at a touch sensor at section 1035d). The controller in communication with the touch sensors of interface 1030 can receive an indication that section 1035d was touched, and can control operation of the humidifier accordingly. For example, the controller can interface with an atomizer and/or a mist fan to control the output of mist from the humidifier. Such interfacing can include operating the atomizer and/or mist fan at a predetermined level of operation according to the level selected by a user via interface 1030.

Additionally or alternatively, a user may increase or decrease the mist output level (e.g., by adjusting the operation of the atomizer and/or a mist fan) by swiping his or her finger along the surface of the interface 1030. The controller in communication with one or more touch sensors of the interface 1030 can be configured to detect the direction of a swipe and adjust the mist output accordingly (e.g., increase mist intensity for an upward swipe and decrease intensity for a downward swipe). In some such examples, the length of the user swipe corresponds to the amount the mist output is adjusted. Further, in some embodiments, a user may cease the emission of mist from the humidifier by swiping his or her finger to a predetermined location (e.g., proximate section 1035g) on the interface 1030. Similarly, in some embodiments, the touch sensor aspect of the interface 1030 can be used to turn on the humidifier.

For example, the touch sensor may be used to turn on the humidifier from a sleep or stand-by mode when sensing the touch of a user. Additionally or alternatively, in some embodiments, interface 1030 includes a proximity sensor separate from the touch sensor. Proximity sensor can include, for example, a wire extending around the touch sensor. In some examples, the proximity sensor can be used to wake-up the humidifier from a sleep or stand-by mode upon detecting an object within close proximity of the interface 1030.

In some examples, one or more sections 1035a-1035g can be lit to identify the current output level of the humidifier. For example, in an exemplary embodiment, section 1035g being lit corresponds to a minimum amount of mist being emitted from the humidifier while section 1035a being lit corresponds to a maximum amount of mist being emitted. In some such examples, a single section can be lit to indicate the output level of the humidifier. In other examples, each section up to the output level can be lit. For instance, in an exemplary configuration, sections 1035c-1035g can be lit when the output level is indicated by section 1035c.

In some embodiments, only a subset of sections 1035a-1035g is used for indicating the output level of the humidifier. For example, in some embodiments, one or more sections may be used to indicate other information. In an exemplary embodiment, sections 1035a-1035f are used to indicate the output level of the humidifier such as described above. However, section 1035g is used to separately indicate additional data, for example, a liquid freshness level. In some such examples, sections used to indicate the humidifier output level (e.g., 1035a-1035g) can be single-colored (e.g., white) sections, while section(s) used to indicate other parameters (e.g., 1035g; liquid freshness) can be a multi-colored (e.g., RGB) section. For example, a liquid freshness indicator section (e.g., 1035g) can change in a spectrum from green to red as the liquid freshness in the tank decreases.

Figure 11:
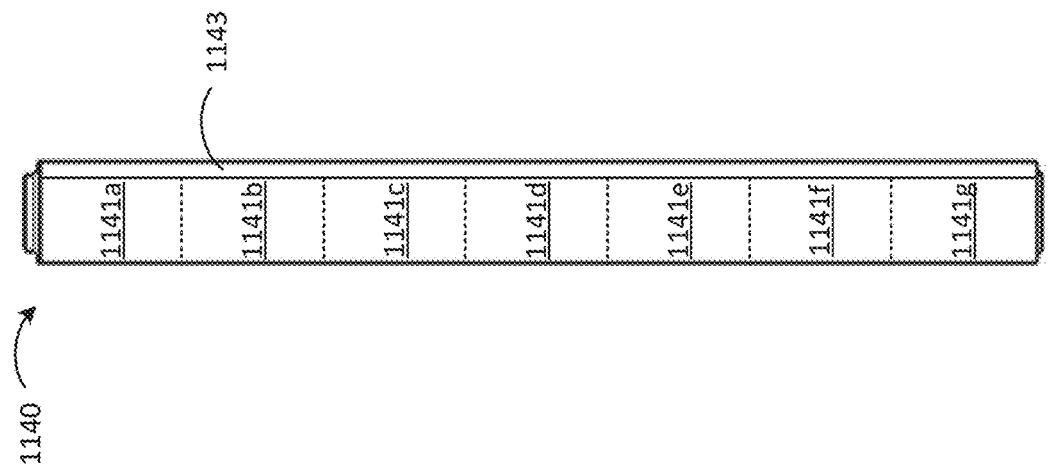
FIG. 11 shows a schematic representation of an exemplary liquid level sensor for a humidifier.

FIG. 11 shows a schematic representation of an exemplary liquid level sensor for a humidifier. In the illustrated example, the liquid level sensor 1140 includes a plurality of sections 1141a-1141g linearly arranged along a first length of the liquid level sensor 1140. In some embodiments, sections 1141a-1141g can function as electrically isolated, independent capacitive sensors in communication with the controller. In some examples, the liquid level sensor 1140 includes a ground electrode (not shown) such that capacitive sections 1141a-1141g can each be capacitively coupled to the ground electrode. Changes from a baseline capacitance (e.g., a calibration capacitance in the absence of liquid) experienced at one or more sections 1141a-1141g can indicate the presence of liquid in the liquid tank impacting the electric field proximate such sections.

Accordingly, in some embodiments, capacitance values at sections 1141a-1141g can be measured and compared to a baseline value in order to determine the location of the junction between the liquid and air within the liquid tank, and thus the liquid level in the liquid tank. For example, with reference to FIG. 11, if sections 1141e-1141g experience significant changes in capacitance from a baseline capacitance value, while sections 1141a-1141d experience less or no change in capacitance, the liquid level may be near the boundary between sections 1141e and 1141d. In some examples, the deviation from the baseline capacitance at section 1141e can be further used to identify a liquid level within section 1141e.

In some embodiments, liquid level sensor 1140 further includes a continuous electrode 1143 extending along a second length of the liquid level sensor 1140. In the illustrated embodiment, the second length of the liquid level sensor 1140 is approximately the entirety of the liquid level sensor 1140. Additionally or alternatively, in some embodiments, the second length along which the continuous electrode 1143 extends can be equal to the first length along which the plurality of sections 1141a-1141g are arranged. In general, the second length can be longer than the first length, shorter than the first length, or equal in size to the first length. Additionally, in various examples, the first and second lengths can be vertically aligned with one another at the top of the lengths, the bottom of the lengths, the center of the lengths, or any other alignment, including independently positioned along the liquid level sensor 1140.

Similar to the discrete sections 1141a-1141g, the continuous electrode 1143 can be capacitively coupled to a ground electrode (not shown). Thus, liquid proximate portions of the continuous electrode 1143 affects the electric field, and thereby the capacitance, between continuous and ground electrodes.

In other examples, each of the discrete sections 1141a-1141g outputs a continuous range of signals corresponding to the level of liquid incident on that given section. For example, in some embodiments, each section outputs a "zero" value when no liquid is incident on the section, a saturated value when the liquid level is above the section, and an intermediate value if the liquid level is between the upper and lower boundaries of the section. The intermediate value can be an indication of the precise liquid level between the upper and lower boundaries of the section. It will be appreciated that the "zero" value indicative of no liquid being incident on the section may or may not correspond to a measurement value of zero. Rather, the "zero" value as used herein refers to a measurement reflecting a liquid level that is below the lower boundary of the section.

For example, during exemplary operation of such an embodiment, if the liquid level is within section 1141d, sections 1141e, 1141f, and 1141g will output the saturation value, sections 1141a, 1141b, and 1141c will output the "zero" value, and section 1141d will output an intermediate value. The intermediate value from section 1141d can be indicative of how far the liquid level extends up the length of section 1141d.

In some embodiments, individual sections 1141a-1141g are individually in communication with other components (e.g., controller 984) such that if one the individual sections stops working, the other sections can still function normally. Additionally or alternatively, in some examples, the controller (e.g., 984) is configured to identify which of the sections (1141a-1141g) is coincident with the top of the liquid level, e.g., section 1141d in the previous example. In some such embodiments, the controller is further configured to disable and/or disregard data from sections outside of a predetermined proximity of the identified section, such as within one section of the identified section. For instance, with reference to the previous example, if the liquid level is within section 1141d, the controller may disable and/or disregard data from sections 1141a, 1141b, 1141f, and 1141g, while considering data from sections 1141c, 1141d, and 1141e. This prevents extraneous data (e.g., from a user's touch or splashing liquid) incident on sections sufficiently far from the identified liquid level from impacting the liquid level measurement via sensors 1141a-1141g.

In some such examples, for example, during a liquid fill process, as the liquid level rises past the junction between two sections (e.g., 1141d and 1141c), the output of the new section (e.g., 1141c) will rise from the "zero" value to an intermediate value, while the value at the previous section (e.g., 1141d) will remain at the saturation value. In some embodiments, after the output from a certain section (e.g., 1141c) rises a predetermined amount beyond the "zero" value (e.g., 15% from the "zero" value to the saturation value), the controller assumes that the liquid level is sufficiently within that section. In some such examples, any drift or errors (e.g., due to human touch, etc.) on lower sections (e.g., 1141d) will be disregarded, since the controller knows the liquid level is at least within the identified section. In some such instances, the controller can continue to monitor the output of the identified section (e.g., 1141c) and, if the output drops below a predetermined amount (e.g., the predetermined amount beyond the "zero" value referenced above), data from lower sections (e.g., 1141d) is considered.

In some examples, the system saves various output values in a memory (e.g., memory 978), such as the "zero" value and the saturation value associated with each section 1141a-1141g. In some such examples, such values can be dynamically updated during sensor operation. For instance, in some embodiments, if the controller detects a transition of the liquid level from section 1141d to section 1141c based on the output rising above the "zero" value for section 1141c, the output value of section 1141d can be saved as an updated saturation value for that section. Similarly, if the output value from section 1141d begins dropping below the saturation value, the value at section 1141c can be saved as an updated "zero" value for that section. In general, the controller can be configured to detect transitions of the liquid level between sections, and use the identified transition to update stored values.

Further, in some embodiments, when the system is initiated (e.g., turned on) and/or when the liquid tank is attached to the base portion, the controller is configured to read the initial values from each of sections 1141a-1141g. If the detected values from one or more such sections is higher than the expected "zero" value, the controller can be configured to analyze the output values from any sections below the identified section for which the initial value is higher than the "zero" value. If the output values from the lower sections are saturated, then the liquid level can be determined based on the intermediate value of the identified section. However, if it is determined that the liquid level is likely not as high as the identified section, the output value for that section can be saved as the new "zero" value for that section.

Additionally or alternatively, in some embodiments, if, during operation or upon initiation, an output value from one or more sections 1141a-1141g is outside of an expected value, a measurement of the liquid level can be made from the continuous electrode 1143. Such a measurement can be made to determine, for example, if a section showing a non-"zero" output is likely to be influenced by the presence of a liquid in the tank, or if the "zero" value should be updated in memory. Thus, it can be advantageous to include both the discrete section and continuous electrode configurations for determining the liquid level within the liquid tank.

In some examples, liquid level sensor 1140 can be factory calibrated to identify expected capacitance values (e.g., on one or more of sections 1141a-1141g and/or continuous electrode 1143) for an empty liquid tank and/or for tanks having various liquid levels. Such factory calibration settings can be stored in a memory such as memory 978 in the base portion 920 of the humidifier or in a separate memory, such as an auxiliary memory in the liquid tank 902. For instance, in some examples, an EEPROM can be stored in the liquid tank (e.g., proximate the user interface 130) and can include calibration data for the liquid level sensor. The factory calibration settings can be referenced when determining a liquid level within a tank during operation and/or when performing a calibration procedure.

Figure 12:
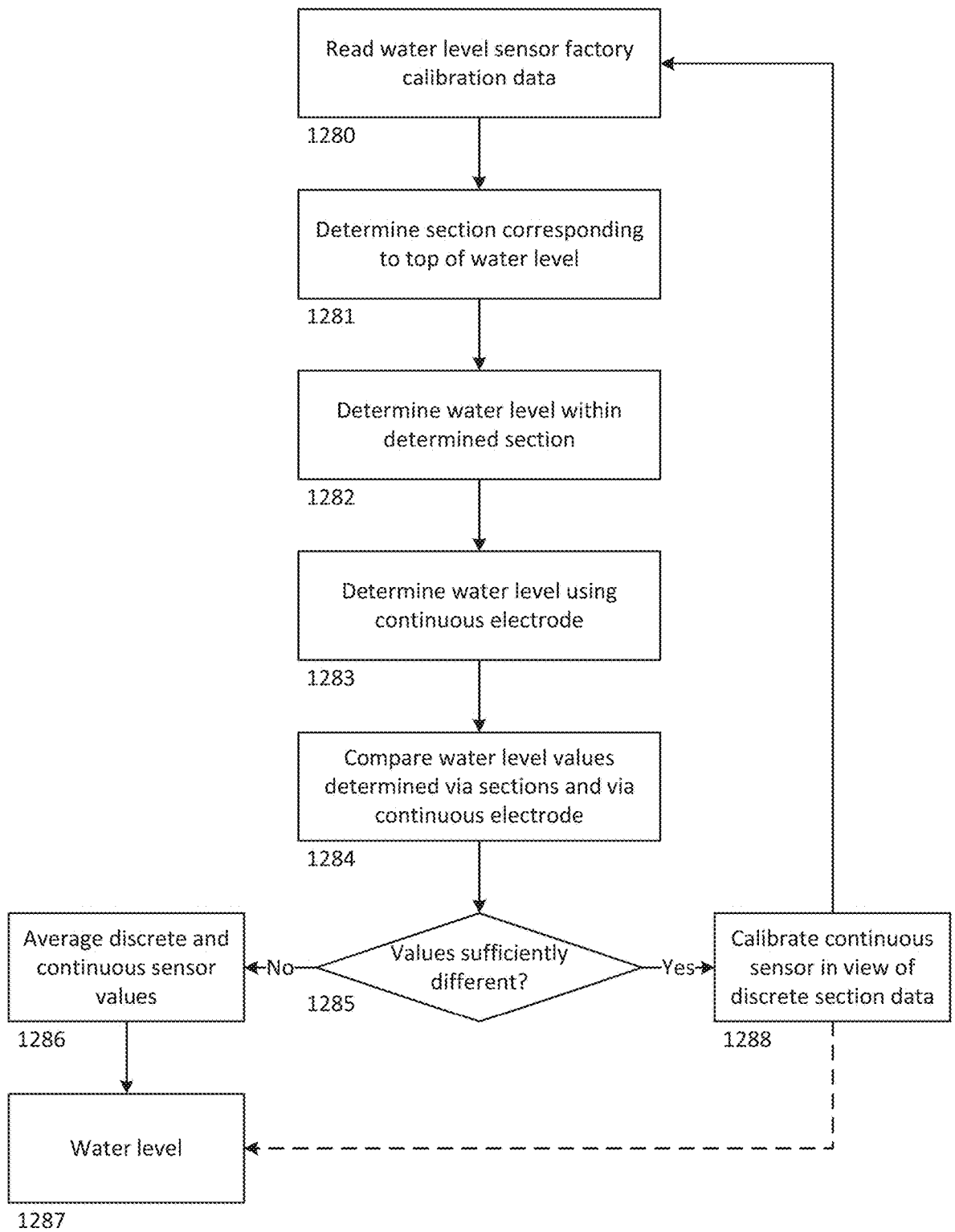
FIG. 12 is a process-flow diagram illustrating an exemplary process for determining a liquid level in the liquid tank.

FIG. 12 is a process-flow diagram illustrating an exemplary process for determining a liquid level in the liquid tank. In some examples, the process illustrated in FIG. 12 can be performed by the controller (e.g., 984). The process of FIG. 12 includes reading any liquid level sensor factory calibration data (1280). Next, the process includes determining the section (e.g., of sections 1141a-1141g) corresponding to the top of the current liquid level (1281), for example, via measured capacitances of the different sections. In some examples, the method includes the step of determining the liquid level within the determined section (1282). That is, in some embodiments, the method can include both determining in which section the top of the liquid level is located and also where within the section the top of the liquid level is located.

During exemplary operation according to some embodiments, once the section with which the top of the liquid level is identified, the controller can act to disable one or more sections separate from the identified section. For instance, in some examples, the controller disables (e.g., disregards, disconnects, or other method of not accounting for data) sections that are used for liquid level sensing that are not the identified section or the sections immediately above or below the identified section. In some such examples, artifacts such as a user touching the humidifier at an inactive section or liquid splashing on an inactive section do not undesirably and incorrectly affect the liquid level measurement.

Additionally, the method can include the step of determining the liquid level using the continuous electrode (e.g., 1143). In some example, this can be performed by measuring a capacitance of the continuous electrode. In various embodiments, determining the liquid level using the sections 1141a-1141g and/or via the continuous electrode 1143 is done using the factory calibration data read in step 1280.

The method can include the step of comparing the liquid level values determined via the sections (e.g., 1141a-1141g) and using the continuous electrode (e.g., 1143) (1284). This comparison can act as a check to ensure that the sensors are working properly. For example, in some cases, the capacitance reading of the continuous electrode (e.g., 1143) can drift over time, leading to measurement errors and incorrect liquid level determinations. Accordingly, after the values are compared (1284), if the values are determined to be sufficiently different (1285), the continuous sensor can be calibrated in view of the data from the discrete sections (1288), and the process can be repeated with the further-calibrated continuous sensor. However, if the determined liquid level values from the continuous and the discrete sections are determined to be sufficiently close to one another (1285), the discrete and continuous values can be averaged together (1286). In the method of FIG. 12, the average of the determined discrete and continuous liquid levels is considered to be the liquid level in the tank (1287).

In some embodiments, the step of calibrating the continuous sensor in view of the discrete section data (1288) comprises updating a value in memory (e.g., a "zero" value, a saturation value, or the like) such that the liquid level determined via the sections and via the continuous electrode are sufficiently close in value. In some embodiments, in addition to calibrating the continuous sensor in view of the discrete section data (1288), the method can include the step of determining the liquid level (1287), for example, from the discrete section data alone.

In various embodiments, the liquid level sensor(s) (e.g., the continuous electrode sensor and/or the discrete sections) can be sampled at regular intervals. For instance, in some examples, the liquid level can be detected n times per minute or second (with n being an integer value), every minute, every 10 minutes, every hour, every day, or any other appropriate period of time. Additionally or alternatively, one or both of the continuous electrode liquid level sensor and the discrete section liquid level sensor can be calibrated or recalibrated based on various detected conditions of the detected liquid level. For example, in some embodiments, when a new liquid level is detected, if the new liquid level is beyond a threshold value or a threshold change in values from the previous reading such that the liquid level is unlikely to be correct (e.g., the liquid level is less than zero or changed by an unlikely amount), the sensor(s) can be recalibrated, for example, using factory calibration values Various configurations have been described. Several non-limiting examples of humidifier operation that can be performed using such exemplary humidifier configurations are described below.

Controlling Humidifier Output

With further reference to FIG. 9, as described elsewhere herein, the controller 984 can communicate with the interface 930 to receive an input from a user representative of a desired level or change in level of humidifier operation. For example, a user may swipe his or her finger along a touch sensor portion of the interface 930 to indicate an increase or decrease in humidifier operation (e.g., in the amount of mist expelled into the ambient atmosphere). Additionally or alternatively, a user may touch a location on the touch sensor portion of the interface 930 to indicate a desired level of operation.

The controller 984 can adjust operation of one or more humidifier components to adjust the humidifier output according to the received commands from the interface 930. In some examples, the controller 984 can adjust the operation (e.g., the operating power) of the atomizer 972 in order to produce more or less mist. Additionally or alternatively, the controller 984 can adjust the operating speed of a fan 976 (e.g., a mist fan) to control the speed at which mist is expelled from the humidifier. In some examples, the controller 984 always controls the same components to adjust the humidifier output level. In other examples, the controller 984 may selectively adjust one or both of the atomizer 972 and the fan 976 depending on the magnitude of output level change and/or desired output level.

Additionally or alternatively, the controller 984 can be configured to adjust the output of the humidifier (e.g., the atomizer 972 and/or the fan(s) 976) separately from commands received via interface 930. In some examples, the controller 984 can be configured to receive control data from a user via the communication interface 982. In some such examples, the user can adjust the humidifier settings (e.g., mist output, etc.) from an external source, such as via a web interface and/or an application running on the user's mobile device, such as a smartphone, tablet, or the like, for example, as described in U.S. patent application Ser. No. 15/665,616, titled "Humidifier User Interaction", which is incorporated into this disclosure by reference above.

In still further examples, as described elsewhere herein, the controller 984 can receive data from one or more sensors, such as sensors 980 in the base portion 920 of the humidifier and/or external sensors in communication with controller 984 via communication interface 982. In some such examples, the controller 984 can be configured to receive data from such sensors, such as humidity and/or temperature data representative of the humidifier's surrounding environment, and adjust humidifier operation accordingly. For instance, in an exemplary embodiment, the controller 984 monitors the humidity of the environment surrounding the humidifier and, if the surrounding humidity drops below a threshold value, the controller 984 acts to turn on and/or increase the operating level of the humidifier. Similarly, in another exemplary embodiment, if the controller 984 senses the humidity of the surrounding environment to exceed a threshold, the controller 984 can act to reduce and/or shut off the humidifier output.

Figure 13:
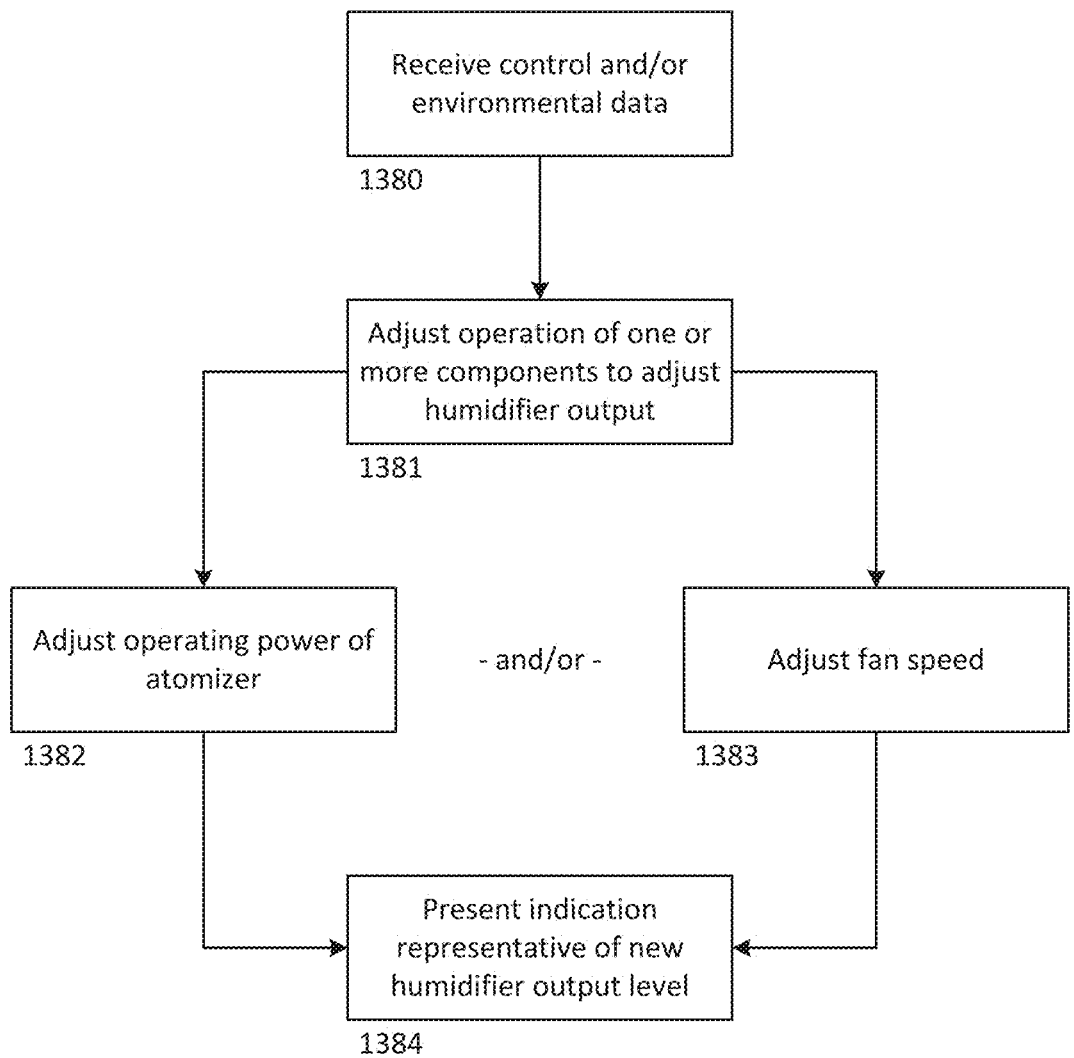
FIG. 13 is a process-flow diagram illustrating a process by which the humidifier output can be adjusted.

FIG. 13 is a process-flow diagram illustrating a process by which the humidifier output can be adjusted. The method includes the steps of receiving control and/or environmental data (1380), for example, via the controller. As described, control data can be provided via interface (e.g., 930) or from an external source, such as via communication interface (e.g., 982), and environmental data can be provided via internal sensors (e.g., 980) or external sensors via communication interface (e.g., 982). The process includes, after receiving control and/or environmental data, adjusting operation of one or more components to adjust the humidifier output (1381). This can include, for example, adjusting the operating power or other operating parameters of the atomizer (1382) and/or adjusting a fan speed (1383). After adjusting the humidifier output, the method includes the step of presenting an indication representative of a new humidifier output level (1384). Such presentation can be done, for example, via an interface (e.g. 930) on the humidifier itself and/or via an external device (e.g., via communication interface 982), such as a web interface and/or an application running on the user's mobile device, such as a smartphone, tablet, or the like, for example, as described in U.S. patent application Ser. No. 15/665,616, titled "Humidifier User Interaction", which is incorporated into this disclosure by reference above.

Determining and Displaying Liquid Freshness

In some examples, the controller 984 can store determined liquid level readings in memory 978. The controller can monitor the liquid level over time using timer 974 and liquid level values stored in memory 978. In some examples, the controller 984 can determine the amount of time that has passed since fresh liquid has been added to the humidifier and determine a liquid freshness level based on the amount of time. In further examples, the controller 984 can determine a liquid freshness level based on a determined time that fresh liquid was added and the amount of fresh liquid that was added. For example, if an amount of fresh liquid is added to the humidifier that is equal to half of the total volume of liquid in the humidifier (e.g., based on detected changes in the liquid level), the freshness level of the liquid may be lower than that if all of the liquid in the humidor were replaced with fresh liquid.

Additionally or alternatively, the liquid freshness can be measured using a liquid freshness index. In some such examples, when the liquid tank (e.g., 102) is filled with fresh liquid, the freshness index starts at zero. As long as no additional fresh liquid is added, the freshness index increases over time. For example, in some embodiments, the freshness index increases by a predetermined amount at regular intervals.

In some examples, the controller 984 can continuously or periodically update the determined liquid freshness based on data received from the tank water level sensor 940 and the timer 974. In various embodiments, freshness levels can be updated at any of a variety of intervals, such as n times per minute or second (with n being an integer value), every minute, every 10 minutes, every hour, every day, or any other appropriate period of time.

Once the liquid freshness is determined, the controller 984 can control the interface 930 to present an indication of the liquid freshness. For example, in some embodiments, the interface 930 includes a section (e.g., section 1035g in FIG. 10) dedicated to displaying an indication of liquid freshness. Such a section can include a light source (e.g., one or more LEDs) capable of outputting a variety of colors of light that is controllable via the controller 984. The controller 984 can adjust the color light emitted via the section of the interface 930 to indicate the liquid freshness to a user. In some examples, the color is green when the liquid is freshest and changes toward yellow or red as the liquid becomes staler. It will be appreciated that any color presentation scheme is possible in which the color changes with the liquid freshness to quickly inform the user of the freshness of the liquid.

Figure 14:
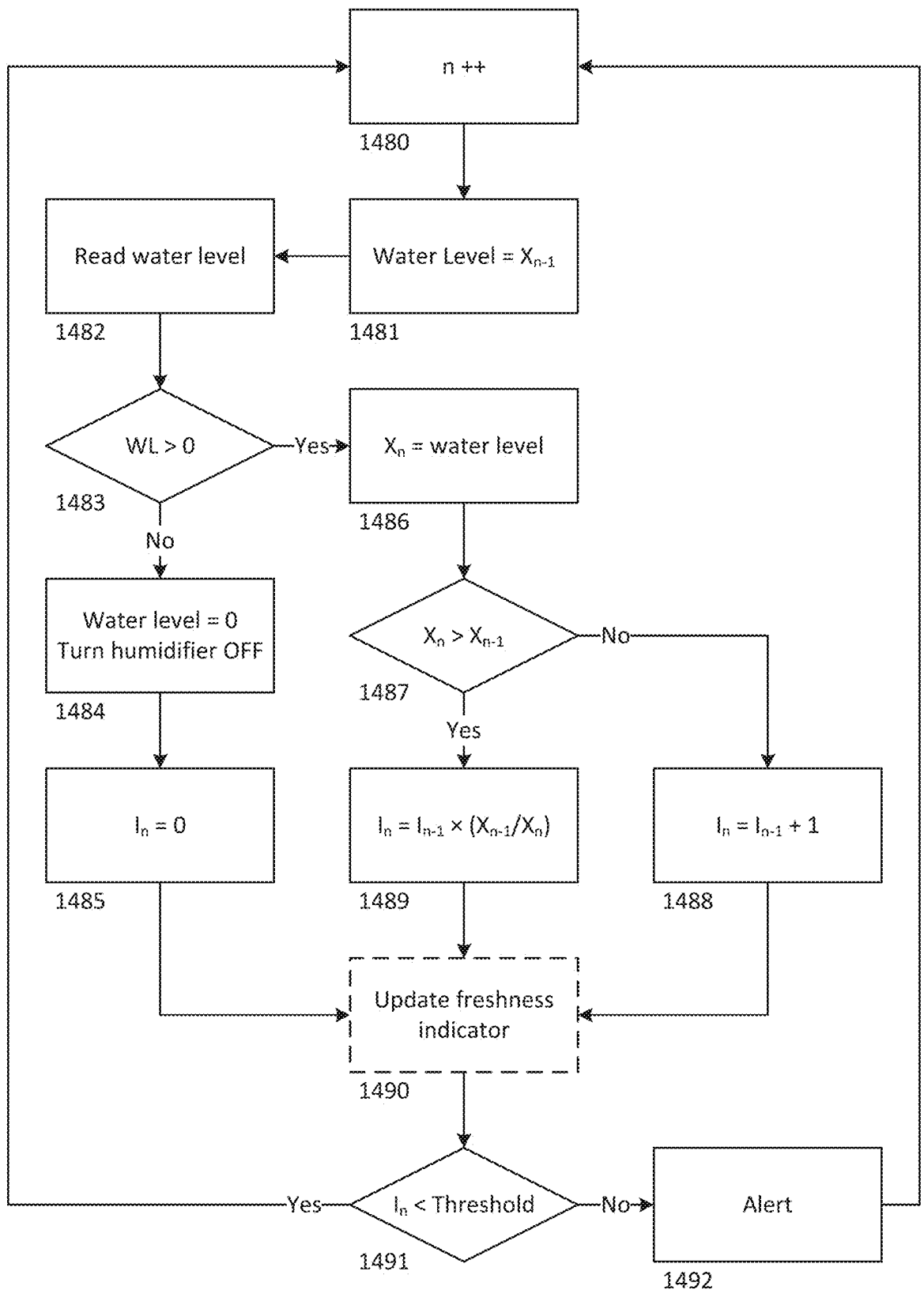
FIG. 14 is a process-flow diagram showing an exemplary a process for updating the liquid freshness index in a humidifier.

FIG. 14 is a process-flow diagram showing an exemplary process for updating the liquid freshness index in a humidifier. In some examples, the method of FIG. 14 can be performed repeatedly, for example, periodically, to continually update the liquid freshness index. In an exemplary embodiment, an index n is increased from a previous iteration of the freshness analysis. After increasing index n (1480), a current liquid level value corresponds to the liquid level measured in the previous iteration (n−1), such that the liquid level is $X_{n-1}$ (1481). The method includes the step of reading the liquid level (1482), for example, using the liquid level sensor and the method described in FIG. 12. If the liquid level is not greater than zero (1483), the liquid level is set at zero and the humidifier is turned off (1484). If there is assumed to be no liquid in the humidifier, the updated freshness index ($I_n$) of the "liquid" is set to zero (1485).

If the liquid level is determined to be greater than zero (1483), then the new liquid level is set as a value $X_n$ (1486). The new liquid level $X_n$ is compared to the previous liquid level $X_{n-1}$ (1487). If the new liquid value $X_n$ is not greater than the previous liquid level $X_{n-1}$, then it is assumed that no new fresh liquid has been added to the tank, and the liquid freshness index is updated so that the new liquid freshness index $I_n$ in increased by one from the previous liquid freshness index $I_{n-1}$ (1488).

However, if the new liquid value $X_n$ is greater than the previous liquid level $X_{n-1}$, then it is assumed that fresh liquid has been added to the liquid tank. In such examples, the previous freshness index $I_{n-1}$ is scaled by a factor of $X_{n-1}/X_n$ such that the updated liquid freshness index $I_n = I_{n-1} \times X_{n-1}/X_n$ (1489). That is, since $X_n > X_{n-1}$, the scaling factor $X_{n-1}/X_n$ is less than one and the freshness index $I_n$ decreases from the previous value $I_{n-1}$, implying the liquid in the liquid tank has increased in freshness. The increase in freshness depends on the amount of new fresh liquid added to the tank $(X_n - X_{n-1})$ and the amount of liquid that was in the tank previously $X_{n-1}$.

As described with respect to steps 1485, 1488, and 1489, the liquid freshness index is updated during each iteration of the process of FIG. 14. In some examples, a freshness indicator (e.g., a colorized LED indication of the liquid freshness or other indication on interface 130) is updated to reflect the new liquid freshness index $I_n$ (1490). Additionally or alternatively, the liquid freshness index $I_n$ can be presented to a user via a remote interface, such as a web interface and/or an application running on the user's mobile device, such as a smartphone, tablet, or the like, for example, as described in U.S. patent application Ser. No. 15/665,616, titled "Humidifier User Interaction", which is incorporated into this disclosure by reference above.

According to the method of FIG. 14, the updated liquid freshness index $I_n$ is compared with a threshold (1491). If the liquid freshness index $I_n$ is less than the threshold, the counting index n increases (1480) and the process is repeated, for example, according to a scheduled liquid freshness analysis. However, in some examples, if the liquid freshness index $I_n$ meets the threshold, the system can be configured to generate an alert (1492) to indicate that the liquid in the humidifier has likely become or is becoming stale. The alert can include, for example, presenting a display corresponding to the alert on the interface (e.g., 1030), such as by lighting one or more of various sections 1035a-1035g in a predetermined combination and/or in a certain color. In an exemplary embodiment, the alert includes lighting section 1035g of the interface 1030 of FIG. 10 red. Additionally or alternatively, the alert can include an audible alert and/or an alert communicated to the user over a network (e.g., the Internet) or via direct communication, such as via a Bluetooth® connection via communication interface 982. In some such examples, the user can receive such alerts via a web interface and/or an application running on the user's mobile device, such as a smartphone, tablet, or the like, for example, as described in U.S. patent application Ser. No. 15/665,616, titled "Humidifier User Interaction", which is incorporated into this disclosure by reference above.

Figure 15:
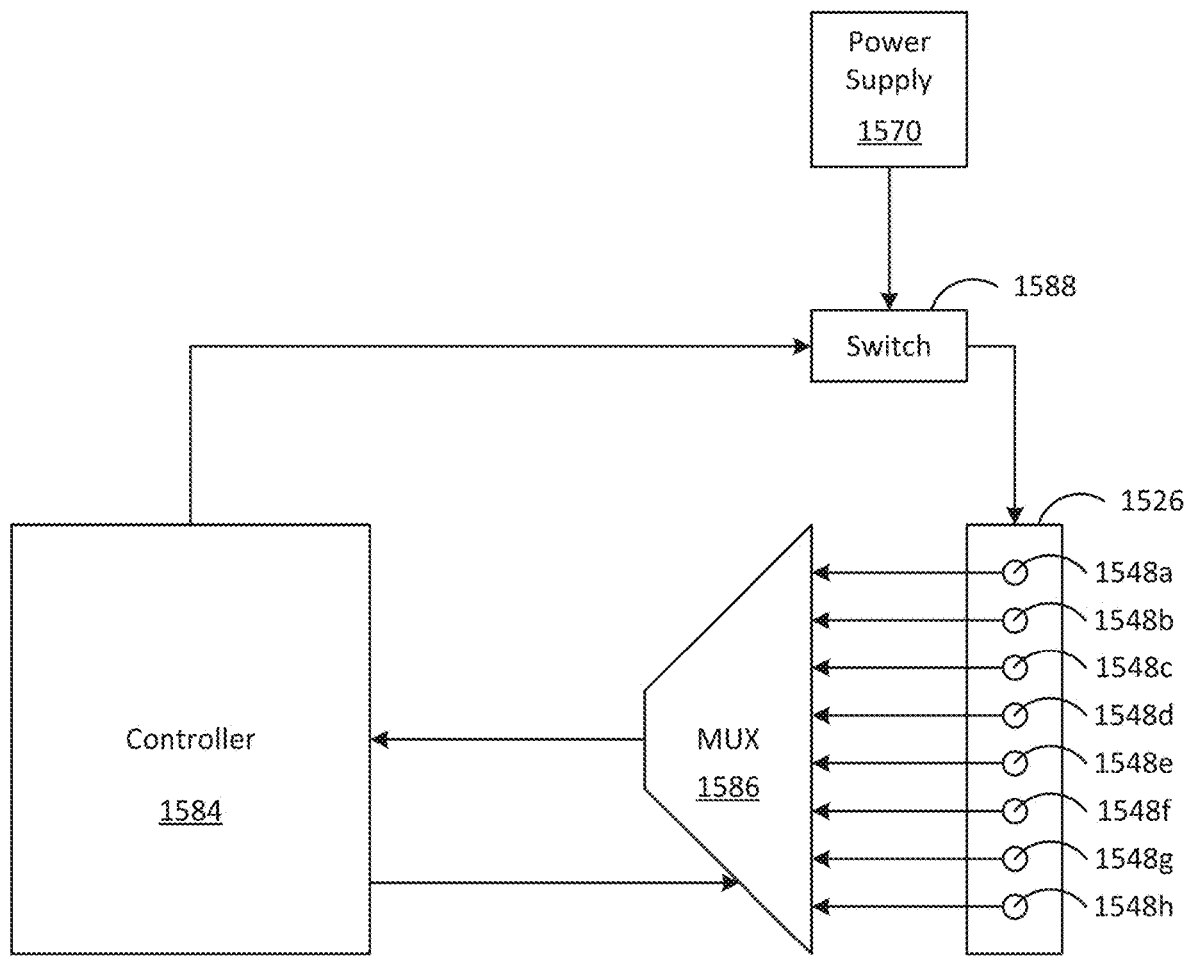
FIG. 15 is a schematic diagram showing an exemplary multiplexer configuration in a humidifier.

As described with respect to FIG. 9, in some embodiments, the humidifier can include a multiplexer arranged to monitor the signals at a variety of locations, such as pins in a connector, by the controller. FIG. 15 is a schematic diagram showing an exemplary multiplexer configuration in a humidifier. The humidifier of FIG. 15 includes a multiplexer 1586 in communication with a controller 1584 and a plurality of pins 1548a-1548h of a lower connector 1526. In some embodiments, the controller 1584 provides a control signal to the multiplexer 1586 in order to read the signal from one of the plurality of pins 1548a-1548h.

In the illustrated example, the controller 1584 is in communication with a switch that can be used to selectively apply power from a power supply 1570 to one or more pins 1548a-1548h of lower connector 1526 via switch 1588. In some embodiments, the controller 1584 operates to read the signal on each of pins 1548a-1548h one-by-one via the multiplexer 1586 and compares each signal to an expected value. If the measured value one or more of pins 1548a-1548h does not meet the expected value (e.g., does not fall within a predetermined range of values), the controller 1584 detects a fault condition in the humidifier.

In some embodiments, the controller 1584 can be configured to diagnose the detected fault condition based on the signal(s) received from pins 1548a-1548h. For example, in an exemplary fault-detection process, the controller 1584 can identify if any of pins 1548a-1548h are shorted together, such as due to improper placement of the tank on the base portion or liquid ingress into the connector.

In some embodiments, the controller 1584 is configured to disable operation of the humidifier when a fault is detected. In some such embodiments, the fault detection is performed at start-up of the humidifier and only allows operation of the humidifier when no fault is detected. Additionally or alternatively, the controller can be configured to alert a user of a detected fault condition. For instance, in some examples, the controller can alert a user of a fault condition via an interface, such as interface 130. With respect to FIG. 10, in some examples, the controller can be configured to light a predetermined number or pattern of light sections 1035a-1035e upon detecting a fault condition. However, in some cases, the fault condition (e.g., improper connection between the base and the tank or a short circuit between pins due to liquid ingress) may prevent the controller from properly controlling interface 1030. Additionally or alternatively, the controller can communicate a detected fault condition to a user via a user's device, such as a computer or a smart device (e.g., a smartphone, tablet, etc.). Such communication can be performed locally, for example, over a Bluetooth® or other connection. Additionally or alternatively, an alert can be communicated over a web interface. The user can receive the alert, for example, via a web-based interface and/or an application running on the user's mobile device, such as a smartphone, tablet, or the like, for example, as described in U.S. patent application Ser. No. 15/665,616, titled "Humidifier User Interaction", which is incorporated into this disclosure by reference above.

Various non-limiting exemplary embodiments have been described. It will be appreciated that suitable alternatives are possible without departing from the scope of the examples described herein. These and other examples are within the scope of the following claims.

The invention claimed is:

1. A humidifier system comprising:
   a liquid tank;
   a base portion connectable to the liquid tank;
   a reservoir positioned in the base portion and in fluid communication with the liquid tank when the liquid tank and base portion are connected;
   a liquid level sensor disposed on a sidewall of the liquid tank, the liquid level sensor comprising:
   (a) a plurality of discrete electrodes linearly arranged along a first length of the liquid level sensor, each of the plurality of discrete electrodes having a lower boundary and an upper boundary, wherein each of the plurality of discrete electrodes is electrically isolated from every other discrete electrode in the plurality of electrodes, and wherein each of the plurality of discrete electrodes is configured to output a discrete output signal comprising one of:
   (i) a zero value signal when the liquid level in the liquid tank is below the lower boundary of the respective discrete electrode;

(ii) a saturation value signal when the liquid level in the liquid tank is above the upper boundary of the respective discrete electrode; and (iii) an intermediate value signal when the liquid level in the liquid tank is above the lower boundary of the respective discrete electrode and below the upper boundary of the respective discrete electrode, the intermediate value signal being representative of the liquid level being between the lower boundary and the upper boundary of the respective discrete electrode; and (b) a continuous electrode extending along a second length of the liquid level sensor and configured to produce an output signal indicative of the liquid level in the liquid tank; and a controller in communication with the continuous electrode and the plurality of discrete electrodes of the liquid level sensor and being configured to:

receive the output signal indicative of the liquid level in the liquid tank from the continuous electrode;

receive each of the discrete output signals from each of the plurality of discrete electrodes; and determine a level of liquid in the liquid tank based on the received output signal from the continuous electrode and the output signals from each of the plurality of discrete electrodes.

2. The humidifier system of claim 1, wherein, in determining the level of the liquid in the liquid tank, the controller is configured to:

determine a first liquid level value based on the output signal indicative of the liquid level in the liquid tank from the continuous electrode;

determine a second liquid level value based on each of the discrete output signals from the plurality of discrete electrodes;

compare the determined first liquid level to the determined second liquid level;

if the difference between the first liquid level value and the second liquid level value is below a predetermined threshold, determine an average of the first liquid level value and the second liquid level value; and establish the average of the first liquid level and the second liquid level as the level of the liquid within the liquid tank.

3. The humidifier system of claim 2, wherein the controller is further configured to, if the difference between the first liquid level value and the second liquid level value is above the predetermined threshold, calibrate the continuous electrode based on the received output signals from the plurality of discrete electrodes.

4. The humidifier system of claim 1, wherein the controller is further configured to:

repeatedly determine the level of the liquid in the liquid tank over a plurality of times;

determine a liquid freshness index based on the level of the liquid in the liquid tank over the plurality of times; and output an indication of liquid freshness.

5. The humidifier system of claim 4, further comprising a freshness indicator in communication with the controller, and wherein the freshness indicator comprises a colored light indicator, and light output by the freshness indicator is representative of the liquid freshness index.

6. The humidifier system of claim 1, further comprising an upper connector positioned on the liquid tank and a lower connector positioned on the base portion such that, when the liquid tank is connected to the base portion, the upper connector connects with the lower connector.

7. The humidifier system of claim 6, wherein the controller is positioned in the base portion of the humidifier system, and wherein the controller is in electrical communication with the liquid level sensor via the connection between the upper connector and the lower connector when the liquid tank is connected to the base portion.

8. The humidifier system of claim 6, further comprising a touch interface positioned on the liquid tank and in communication with the controller via the connection between the upper connector and the lower connector when the liquid tank is connected to the base portion, and wherein the controller is configured to receive an input signal from the touch interface and adjust output of the humidifier system based on the received input signal.

9. The humidifier system of claim 8, further comprising a mate ring coupled to the upper connector, the touch interface, and the liquid level sensor, the mate ring including one or more electrical channels to facilitate electrical communication between the upper connector and the touch interface and between the upper connector and the liquid level sensor.

10. The humidifier system of claim 6, wherein:

the upper connector is connected to the liquid tank via a compressible material; and/or the lower connector is connected to the base portion via a compressible material.

11. The humidifier system of claim 6, wherein the upper connector and the lower connector each comprise a plurality of connecting pins such that connecting the upper connector to the lower connector forms a plurality of conductive channels between the upper connector and the lower connector.

12. The humidifier system of claim 11, further comprising a multiplexer in communication with the controller and one or more of the plurality of conductive channels, such that the multiplexer is configured to selectively establish electrical communication between one of the one or more of the plurality of conductive channels and the controller, and wherein the controller is further configured to, upon startup of the humidifier system:

sequentially receive data from each of the one or more of the plurality of conductive channels via the multiplexer, compare the received data from each of the one or more of the plurality of conductive channels to an expected value; and if the difference between the received data and the expected value for any of the one or more of the plurality of conductive channels is greater than a predetermined threshold, detect a fault condition.

* * * * *